(12) United States Patent
Ardes

(10) Patent No.: US 9,555,350 B2
(45) Date of Patent: Jan. 31, 2017

(54) BYPASS VALVE, DEVICE COMPRISING BYPASS VALVE, AND FILTER INSERT OF THE DEVICE

(75) Inventor: Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 673 days.

(21) Appl. No.: 13/985,239

(22) PCT Filed: Feb. 10, 2012

(86) PCT No.: PCT/EP2012/052268
§ 371 (c)(1),
(2), (4) Date: Aug. 13, 2013

(87) PCT Pub. No.: WO2012/110411
PCT Pub. Date: Aug. 23, 2012

(65) Prior Publication Data
US 2013/0327429 A1    Dec. 12, 2013

(30) Foreign Application Priority Data

Feb. 18, 2011   (DE) .................... 10 2011 011 752
Mar. 4, 2011    (DE) .................... 10 2011 005 106

(51) Int. Cl.
| | | |
|---|---|---|
| *B01D 35/147* | (2006.01) | |
| *F16K 15/06* | (2006.01) | |
| *B01D 27/10* | (2006.01) | |

(52) U.S. Cl.
CPC ......... *B01D 35/1475* (2013.01); *B01D 27/103* (2013.01); *B01D 35/147* (2013.01);
(Continued)

(58) Field of Classification Search
CPC . B01D 35/147; B01D 27/103; B01D 35/1475; Y10T 137/86928; Y10T 137/86509; Y10T 137/7841; Y10T 137/7867; Y10T 137/86807; Y10T 137/86525; Y10T 137/8085; Y10T 137/7976; F16K 15/063
See application file for complete search history.

(56) References Cited

U.S. PATENT DOCUMENTS

| | | | |
|---|---|---|---|
| 3,216,571 A * | 11/1965 | Whiting | ............... B01D 29/15 116/268 |
| 3,297,162 A | 1/1967 | Mouwen | |
| 2012/0006731 A1 * | 1/2012 | Swift, Jr. | ............... B01D 29/58 210/133 |

FOREIGN PATENT DOCUMENTS

| | | |
|---|---|---|
| DE | 20308834 | 10/2003 |
| EP | 1199093 | 4/2002 |

OTHER PUBLICATIONS

International Search Report, May 7, 2012.

* cited by examiner

*Primary Examiner* — Atif Chaudry
(74) *Attorney, Agent, or Firm* — Greer, Burns & Crain ltd.

(57) ABSTRACT

A bypass valve having an adjustable flow resistance for a device through which a fluid medium flows. The valve includes a seat and a body which is biased closed, and which is movable in the opening direction by a fluid medium pressure difference between the inflow and the outflow side of the valve when the pressure difference exceeds a threshold. A bypass flow path connects the inflow side to the outflow side through the seat. The bypass valve includes a screen disposed in the bypass flow path. The valve body has two different open positions that depend on the fluid medium pressure difference. The entire cross-section of the bypass flow path is covered by the screen in a first valve body open position with a lower pressure difference, and a screen-free bypass flow path cross-section is exposed in a second valve body open position with a greater pressure difference.

20 Claims, 35 Drawing Sheets

(52) U.S. Cl.
CPC .... *F16K 15/063* (2013.01); *B01D 2201/0415* (2013.01); *B01D 2201/291* (2013.01); *B01D 2201/305* (2013.01); *B01D 2201/4084* (2013.01); *Y10T 137/7841* (2015.04); *Y10T 137/7867* (2015.04); *Y10T 137/7976* (2015.04); *Y10T 137/8085* (2015.04); *Y10T 137/86509* (2015.04); *Y10T 137/86525* (2015.04); *Y10T 137/86807* (2015.04); *Y10T 137/86928* (2015.04); *Y10T 137/87338* (2015.04)

BYPASS VALVE, DEVICE COMPRISING BYPASS VALVE, AND FILTER INSERT OF THE DEVICE

CROSS-REFERENCES TO RELATED APPLICATIONS

This application claims the benefit of the German patent application No. 10 2011 011 752.0 filed on Feb. 18, 2011, and of the German patent application No. 10 2011 005 106.6 filed on Mar. 4, 2011, the entire disclosures of which are incorporated herein by way of reference.

BACKGROUND OF THE INVENTION

The present invention relates to, as first subject matter, a bypass valve of a device through which a fluid medium flows and that has a variable flow resistance, made up of a valve seat and a valve body that cooperates with the valve seat and to which a preloading force is applied in the closing direction, the valve body being movable in the opening direction by a pressure difference in the medium, exceeding a specifiable threshold value, between the inflow side and the outflow side of the bypass valve, a bypass flow path connecting the inflow side and the outflow side of the bypass valve, while bypassing the device, running through the valve seat. As second subject matter, the present application relates to a device having such a bypass valve. The third subject matter of the present application is a filter insert of such a device.

From DE 100 63 283 A1, a sieve filter is known for lines that conduct a fluid medium, in particular for hydraulic pressure lines in internal combustion engines. The sieve filter is substantially made up of a hollow cylindrical basic body having an inlet and an outlet, and of a fine mesh filter element through which the fluid medium flows. When the filter element is clogged, or in the case of a highly viscous fluid medium, the sieve filter has a bypass function. The sieve filter is effectively connected to a spring element, and, together with the spring element, can be placed between two axially spaced counter-surfaces within the pressure line in such a way that the inlet thereof and the spring element lie against the counter-surfaces with a preloading. Here, a basic body of the sieve filter seals a bypass channel that runs past the filter element. The bypass channel can be cleared by axial displacement of the basic body against the force of the spring element, said displacement resulting from an increase in the pressure of the fluid medium.

A disadvantage of this known sieve filter is that in the case of an opening of the bypass channel it lets through completely unfiltered medium. In many applications, this can cause damage or disturbance to downstream components.

From each of EP 1 199 093 A1, U.S. Pat. No. 5,395,518 A, and JP 10-159 530 A, a device is known having an integrated bypass valve, the device being in each case a liquid filter having a filter insert. In these known liquid filters, the filter insert has a sieve element situated in the bypass flow path, the sieve element being fixedly connected to the filter insert and at the same time supporting a spring that loads the valve body with a preloading force acting in the closing direction.

In these known liquid filters, it is regarded as disadvantageous that in the case of blockage both of the filter insert, or of its filter material body, and of the sieve element, there can occur a failure of the liquid supply and thus disturbance or failure of downstream components such as an internal combustion engine, even if the filter bypass valve opens in the intended manner. Moreover, in this case there is the danger that either the filter material body or the sieve element, or both, will be damaged due to the liquid pressure difference, which necessarily increases strongly when there is blockage; in particular, that these elements will be broken through and destroyed. After the occurrence of such damage, the liquid filter no longer functions at all, and dirt particles, and possibly even parts of the filter material body and/or of the sieve element, can move to the outlet of the liquid filter and to downstream components, where they can cause significant damage.

From DE 19 77 428 U and U.S. Pat. No. 3,297,162 A, it is known to equip a filter, such as a lubricant oil filter of an internal combustion engine, with two separate bypass valves having different opening pressure, each having two operating positions, namely closed or open. In this way, it is achieved that the filter can assume three functional states, namely a fine filtering function, with flow through a fine-pored filter element with two closed bypass valves, a coarse filtering function with flow through a coarse-pored filter element, bypassing the fine-pored filter element with open first bypass valve, and an unfiltered pass-through function, bypassing both filter elements, with second bypass valve also still open.

Here it is regarded as a disadvantage that the technical outlay resulting from the two separate bypass valves is relatively high, resulting in correspondingly high production and installation costs and an increased space requirement.

SUMMARY OF THE INVENTION

Therefore, the object of the present invention is to create a bypass valve of the type named above, a device having such a bypass valve, and a filter insert of such a device that avoid the indicated disadvantages and that ensure reliable functioning, in particular with a simple design, avoiding damage to the device itself and to downstream components while at the same time ensuring an uninterrupted supply of fluid medium to downstream components.

The solution of the part of the subject relating to the bypass valve is achieved according to the present invention by a bypass valve of the type named above that is characterized in that a sieve element is situated in the bypass flow path, and that the valve body has two different opening position regions, which are a function of the difference in the pressure in the medium, such that in a first opening position region of the valve body, given a smaller pressure difference, the entire cross-section of the bypass flow path is covered by the sieve element, and, in a second opening position region of the valve body, given a larger pressure difference, in addition a bypass flow path cross-section is released free of the sieve.

In the normal operation of the associated device, the bypass valve is closed, and the entire volume flow of the fluid medium flows through the device. When the flow resistance of the device increases beyond a specified level, a difference in medium pressure that thereby arises between an inflow side and an outflow side of the bypass valve ensures that the valve body of the bypass valve is moved in the opening direction, into its first opening position region. In this first opening position region, a bypass flow path is released from the inflow side to the outflow side, bypassing the device, and this bypass flow path runs through the sieve element of the bypass valve. Thus, given a valve body of the bypass valve in its first opening position region, the medium flow bypassing the device is freed at least of coarser dirt particles, which are retained in the sieve element. In order to avoid an excessive flow resistance in the bypass flow path, it is useful to select the sieve fineness of the sieve elements such that an adequate operating time is achieved up to blockage of the sieve element. If the extreme state is reached in which the sieve element is so strongly blocked by dirt particles that the medium pressure difference between the inflow side and the outflow side increases still further, then this increased medium pressure difference moves the valve body of the bypass valve into its second opening position region. In this second opening position region, the sieve-free bypass flow path cross-section is additionally released, through which medium can then flow from the inflow side immediately to the outflow side with a very low flow resistance, bypassing both the device and the sieve element. In this way, damage or destruction of the device or of the sieve element is reliably avoided. At the same time, a supply of medium to downstream components is always ensured, even if, in extreme operating states, the medium is less well filtered or is unfiltered.

In a preferred development, it is provided that the sieve element, in the second opening position region of the valve body, covers only a part of the cross-section of the bypass flow path, so that the additional sieve-free bypass flow path cross-section is released. This embodiment offers the advantage that a uniform bypass flow path is sufficient, so that the constructive design of the bypass valve remains relatively simple. Depending on the opening position region currently assumed by the valve body, the sieve element then covers either the entire cross-section of the bypass flow path or only a part of this cross-section.

Preferably, the sieve element is fashioned as a part of the valve body and can be moved therewith relative to a contour that limits the bypass flow path, the sieve element, in the first opening position region of the valve body, being movable seated on the contour in sealing fashion, and the sieve element, in the second opening position region of the valve body, being at a distance from the contour. In this embodiment of the bypass valve, the sieve element is therefore allocated to the movable valve body, and is moved together therewith by the different medium pressure differences, into the two different opening position regions that have the two different functions with regard to the bypassing. This embodiment keeps the design of the bypass valve constructively simple.

In a further embodiment, it is preferably provided that the sieve element is detachably connected to the valve body, in particular by pressing or clamping or locking or screwing, or that the sieve element is fixedly connected to the valve body, in particular by gluing or welding, or is made in one piece therewith.

Alternatively, the sieve element can be realized as a part of the contour limiting the bypass flow path, the valve body, in its first opening position region, being axially movable lying on the sieve element in sealing fashion, and the valve body, in its second opening position region, being situated at a distance from the sieve element. In this embodiment as well, the desired functions are achieved with a simple construction.

In a development, it is provided that with its one end face region the sieve element is tightly connected, concentric to the valve seat, to the contour that has the valve seat and that limits the bypass flow path, and that the sieve element has at its other end face region a radially inwardly situated sealing ring region running concentric to the valve seat, and that the axially movable valve body has an outer circumferential region that, in the first opening position region of the valve body, is axially movable lying in sealing fashion on the sealing ring region of the sieve element, and that, in the second opening position region of the valve body, is axially at a distance from the sealing ring region. In this embodiment of the bypass valve, the sieve element is therefore allocated to the movable valve body and is moved together therewith by the different medium pressure differences into the two different opening position regions that have the two different functions with regard to the bypassing.

Here, usefully the sieve element is detachably connected to the contour having the valve seat, in particular is pressed or clamped or locked or screwed thereto, or the sieve element is fixedly connected to the contour having the valve seat, in particular is glued or welded thereto, or is made in one piece therewith.

In order to make the sieve element independent of a particular rotational position relative to the other parts of the bypass valve, and in order at the same time to prevent dirt particles deposited on the sieve element from again moving into the medium flow, the sieve element is preferably realized as a hollow cylindrical ring sieve having a dirt particle collecting region that during operation of the device is open only upwardly.

In order to provide the sieve element with the mechanical stability necessary for its functioning and to permit the use of sieve materials that in themselves are not particularly stable, it is preferably provided that the sieve element have at least one upper and one lower reinforcing ring running in the circumferential direction, as well as a plurality of reinforcing struts running between the reinforcing rings in the axial direction or oblique to the axial direction.

In particular in the embodiment of the bypass valve in which the sieve element is moved with the valve body, the sieve element usefully has guide and centering ribs distributed radially externally over its circumference, which cooperate with a contour that limits an inner circumference of the bypass flow path. In this way, a geometrically precise and functionally reliable orientation and guiding of the sieve element is provided. The guiding and centering ribs can be formed by the above-mentioned reinforcing struts, or can be connected thereto or made in one piece therewith. In a kinematically converse design, the guide and centering ribs can alternatively also be provided on the inner circumference of the contour of the bypass valve that limits the bypass flow path and that accepts the valve body.

In order to achieve the part of the object of the present invention relating to the device, a device is proposed having a bypass valve, the device being characterized in that it is a liquid filter, in particular an oil filter or a fuel filter or a coolant water filter of an internal combustion engine, having a housing having a removable cover, having an inlet, opening into a raw side of the device, for liquid that is to be filtered, and having an outlet, going out from a clean side of the device, for filtered liquid, and having an exchangeable filter insert that separates the raw side and the clean side from one another, made up of a hollow cylindrical filter material body enclosed at its ends by two end plates, and that the bypass valve is a filter bypass valve whose valve seat is situated or fashioned on the filter insert.

The bypass valve is here advantageously integrated functionally and spatially into the liquid filter. During normal operation of the liquid filter, the filter bypass valve is closed and the entire volume flow of the liquid to be filtered flows through the filter material body of the filter insert, in which dirt particles are separated from the liquid and retained. If, after a longer period of use of the filter insert, its filter material body becomes increasingly loaded with dirt particles and its flow resistance increases beyond a specified level, the resulting liquid pressure difference between the raw side and the clean side brings it about that the valve body of the filter bypass valve is moved in the opening direction into its first opening position region. In this first opening position region, a bypass flow path is released from the raw side to the clean side, bypassing the filter material body, and this bypass flow path runs through the sieve element. Thus, even when the filter bypass valve is in its first opening position region the liquid flow bypassing the filter material body is freed at least of coarser dirt particles, which are retained in the sieve element. In order to avoid an excessive flow resistance in the bypass flow path, the sieve fineness of the sieve element is usefully less than the filter fineness of the filter material body. If the extreme state comes about in which the sieve element is also so strongly clogged with dirt particles that the liquid pressure difference between the raw side and the clean side increases still further, beyond a second boundary value, then this increased liquid pressure difference moves the valve body of the filter bypass valve into its second opening position region. In this second opening position region the sieve-free bypass flow path cross-section is additionally released, through which a liquid flow can then flow with a very low flow resistance, bypassing both the filter material body of the filter insert and the sieve element, from the raw side immediately to the clean side. Damage or destruction of the filter material body and/or of the sieve element is thus reliably avoided. At the same time, a supply of liquid to downstream components is always ensured, even if, in extreme operating states, this liquid is less well filtered or unfiltered.

Preferably, the valve seat is fashioned on a central perforation in one of the two end plates of the filter insert. This design keeps the filter insert rotationally symmetrical, which has the advantage that when it is installed in the filter housing, care need not be taken to place it at a particular rotational position relative to the housing.

According to a preferred development, the valve seat is provided on the end plate of the filter insert that is in the upper position during operation of the liquid filter. This situation has the advantage that the risk of a functional disturbance of the filter bypass valve due to settling dirt particles is minimized, because dirt particles settle in a lower region of the liquid filter, due to gravity.

In order to achieve a compact construction of the liquid filter, the valve body is preferably situated in the interior of the hollow cylindrical filter insert and is guided there in axially movable fashion. In this way, an enlargement of the filter housing in order to accommodate the filter bypass valve is advantageously avoided.

In a preferred development, the present invention proposes that the sieve element is fashioned as a part of the valve body and is movable therewith relative to the filter insert, that in the first opening position region of the valve body the sieve element is movable seated in sealing fashion on the filter insert, and that in the second opening position region of the valve body the sieve element is at a distance from the filter insert. In this embodiment of the liquid filter, the sieve element is therefore allocated to the movable valve body, and is moved together therewith by the different liquid pressure differences into the two different opening position regions that have the two different functions with regard to the filter bypassing.

A development of the above-indicated embodiment of the liquid filter provides that the end plate having the valve seat has an annular sealing collar concentric to the valve seat, pointing axially toward the interior of the filter insert, that the sealing collar, in the first opening position region of the valve body, cooperates in sealing fashion with a free end face region of the sieve element that is axially movable with the valve body, and that, in the second opening position region of the valve body, the free end face region of the sieve element that is axially movable with the valve body is axially at a distance from the sealing collar. In this way, a constructively simple and low-cost and simultaneously reliable solution is achieved for the interaction of the end plate with the sealing collar on the one hand and with the sieve element on the other hand.

Because, in the last-described embodiment, the sieve element is moved with the valve body and is brought into and out of engagement with the sealing collar, the sieve element usefully has guide and centering ribs distributed radially outwardly over its circumference, which cooperate with an inner circumference of the hollow cylindrical filter insert, in particular with a perforated support body situated therein. In this way a geometrically precise and functionally reliable guiding of the sieve element is provided. The guide and centering ribs can be formed by the above-mentioned reinforcing struts, or can be connected thereto or made in one piece therewith. In a kinematically converse design, the guide and centering ribs can alternatively also be provided on the inner circumference of the filter insert, in particular on the inner circumference of the support body.

Instead of forming a part of the valve body, as described above, the sieve element can be realized as a part of the filter insert, the valve body, in its first opening position region, being axially movable lying in sealing fashion on the sieve element, and the valve body, in its second opening position region, being at a distance from the sieve element. Thus, in this embodiment the valve body is movable relative to the sieve element, and here as well the two different bypass functions are achieved when the filter bypass valve is open. As a part of the filter insert, each time the filter insert is changed the sieve element is also changed and renewed, promoting reliable functioning.

In a concrete development, it is proposed that the sieve element is tightly connected, with its one end face region, to the end face having the valve seat, concentric to the valve seat, and that the sieve element has, on its other end face region, a sealing ring region situated radially inwardly, running concentric to the valve seat, and that the axially movable valve body has an outer circumferential region that in the first opening position region of the valve body cooperates in sealing fashion with the sealing ring region of the sieve element and that in the second opening position region of the valve body is axially at a distance from the sealing ring region. In this embodiment as well, the construction is technically advantageous, and makes do with a few simple parts.

Here the sieve element can be detachably connected to the end plate having the valve seat, in particular by pressing or clamping or locking or screwing, in order to enable a simple separate exchange as needed, or alternatively the sieve element can be fixedly connected to the end plate having the valve seat, in particular by gluing or welding, or can be made in one piece therewith if a separate exchangeability is not required. In a further alternative, the sieve element can be part of the support body of the filter insert. In all the embodiments named here, the sieve element can advantageously be exchanged together with the filter insert without additional outlay.

In normal operation of the liquid filter, a specified boundary quantity of the particles to be deposited from the liquid must be adhered to. At the same time, in the first opening position region of the filter bypass valve the sieve element must remove at least coarser dirt particles from the liquid stream, but must not cause an excessive flow resistance. In order to meet these requirements, according to the present invention it is provided that the filter material body of the filter insert has a filter fineness of between 8 and 25 µm, preferably between 12 and 17 µm, and that the sieve element has a sieve fineness of between 100 and 1000 µm, preferably between 200 and 400 µm.

A first solution of the part of the above-indicated object of the present invention relating to the filter insert is achieved according to the present invention by a filter insert being made up of a hollow cylindrical filter material body enclosed at its ends by two end plates, and having a valve seat of a filter bypass valve, the valve seat being fashioned at a central perforation in one of the two end plates of the filter insert. The first filter insert according to the present invention is characterized in that the end plate having the valve seat has an annular sealing collar pointing axially towards the inside of the filter insert, concentric to the valve seat, for radially sealing interaction with an open end face region of a sieve element that is axially movable with a valve body of the filter bypass valve. This filter insert, which is a replaceable part that is to be exchanged after a specified period of use in the liquid filter, has the elements that are required in order to function properly when used in the liquid filter described above.

A second solution of the part of the object of the present invention relating to the filter insert is achieved according to the present invention by a filter insert being made up of a hollow cylindrical filter material body enclosed at its ends by two end plates, and having a valve seat of a filter bypass valve, the valve seat being fashioned on a central perforation in one of the two end plates of the filter insert. The second filter insert according to the present invention is characterized in that a sieve element in the form of a hollow cylindrical annular sieve is tightly connected, with its one end face region, to the end plate having the valve seat, concentric to the valve seat, and that the sieve element has at its other end face region, situated radially inwardly, a sealing ring region running concentric to the valve seat for interaction with an outer circumferential region of an axially movable valve body of the filter bypass valve. The sieve element can here be part of a support body situated in the interior of the filter material body.

BRIEF DESCRIPTION OF THE DRAWINGS

In the following, exemplary embodiments of the present invention are explained on the basis of a drawing. The Figures of the drawing show the following.

Figure 1:
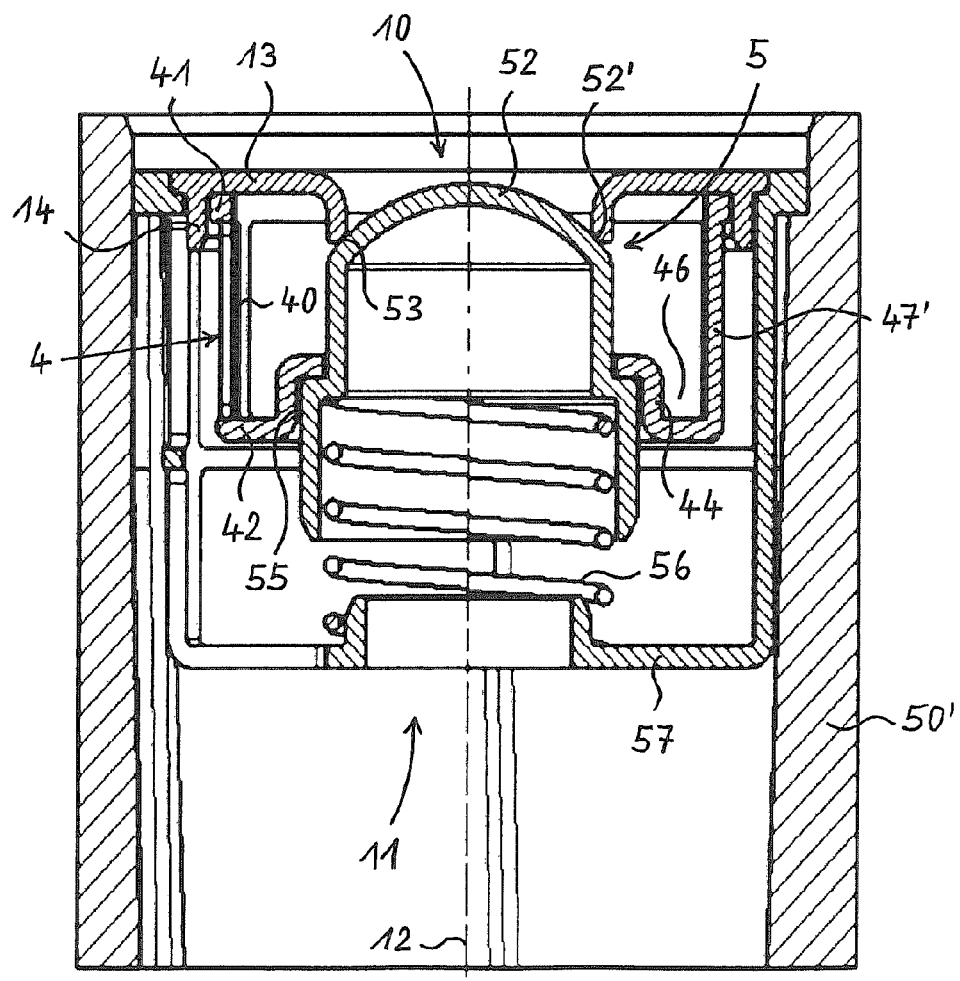
FIG. 1 shows a bypass valve having a sieve element in a first embodiment, in the installed state in the closed position, in longitudinal section.

DETAILED DESCRIPTION OF THE
PREFERRED EMBODIMENTS

In the accompanying drawing, in the various Figures identical parts have always been provided with identical reference characters, so that in the following description of the Figures not all reference characters are explained in connection with each individual Figure of the drawing.

FIG. 1 of the drawing shows a first bypass valve 5 of a device, the rest of which is not shown, having a flow resistance that varies during operation for a fluid medium flowing through the device, for example a liquid. Bypass valve 5 has a valve body 52 that is held and guided in a valve cage 57 so as to be displaceable in the axial direction, i.e. here in the direction of a longitudinal mid-axis 12 of bypass valve 5. Valve body 52 is preloaded by a helical spring 56 with a force acting in its closing direction, i.e. upward according to FIG. 1. An annular valve seat 53 works together with valve body 52, said valve seat being integrally formed on a disk-shaped contour 13. Disk-shaped contour 13 is connected to valve cage 57 to form a constructive unit. In the example shown in FIG. 1, the constructive unit formed in this way is placed into a pipe socket 50' from above and is fastened therein, for example by a clamp seating or by gluing or by welding.

On its downward-pointing side, disk-shaped contour 13 has a circumferential sealing collar 14 that extends axially downward. Sealing collar 14 works together, at its inner circumference, with an upper end face region 41 of a sieve element 4. Sieve element 4 is here made up of a hollow cylindrical annular sieve 40 that is connected to valve body 52 and is therefore movable together with valve body 52 in the axial direction. For this purpose, sieve element 4 has on its lower end face region 42 a clamping ring 44 with which the sieve element is placed, in a clamping seating, onto an outer circumferential region 55 of valve body 52. For mechanical reinforcement, sieve element 4 moreover has, distributed around its circumference, a plurality of reinforcing struts 47' running in the axial direction.

In the system shown in FIG. 1 of bypass valve 5, at the top there is an inflow side 10 and at the bottom there is an outflow side 11 for the fluid medium. In a normal state of the associated device, this device has a relatively low flow resistance, resulting in a low medium pressure difference between inflow side 10 and outflow side 11 of bypass valve 5. In this state, spring 56 holds valve body 52 seated on valve seat 53, so that bypass valve 5 is closed. At the same time, sieve element 4 lies in sealing fashion with its upper end face region 41 on the inner circumference of sealing collar 14.

Figure 2:
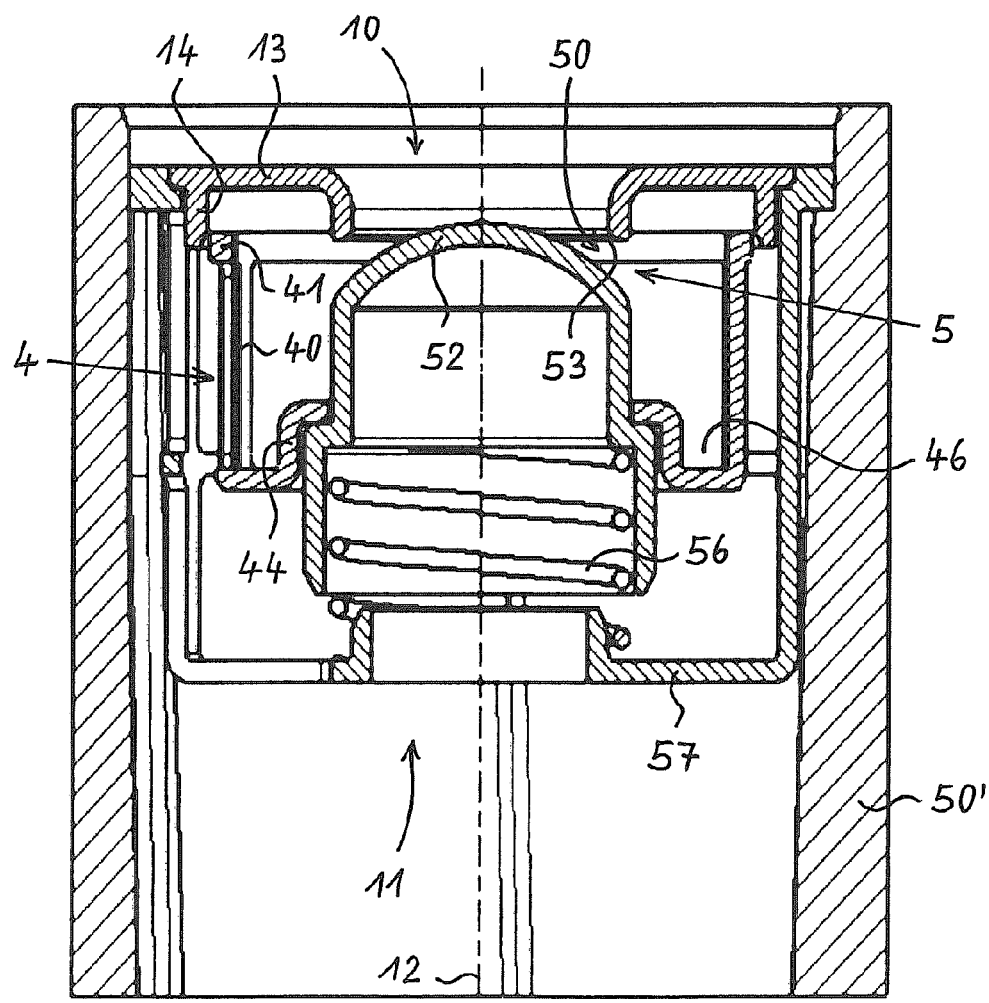
FIG. 2 shows the bypass valve of FIG. 1 in a first opening position, in longitudinal section.

FIG. 2 shows bypass valve 5 in the same representation as FIG. 1, now in a first open position caused by a medium pressure difference, exceeding a first boundary value, between inflow side 10 and outflow side 11. When the medium pressure difference exceeds the first boundary value, a force acts on valve body 52 that displaces this body against the force of spring 56, into the first open position shown in FIG. 2. In this position, valve body 52 is situated at a first, relatively short distance from its valve seat 53, thus releasing a bypass flow path 50. At the same time, upper end face region 41 of sieve element 4 connected to valve body 52 is axially displaced by the same distance, but is still seated in sealing fashion on sealing collar 14. Thus, the medium flowing through bypass flow path 50 flows completely through annular sieve 40 from inflow side 10 to outflow side 11. In this way, at least relatively coarse particles carried along in the medium can be deposited out from the medium and retained at annular sieve 40. Deposited dirt particles collect in a dirt particle collecting region 46 in the lower part of sieve element 4.

Figure 3:
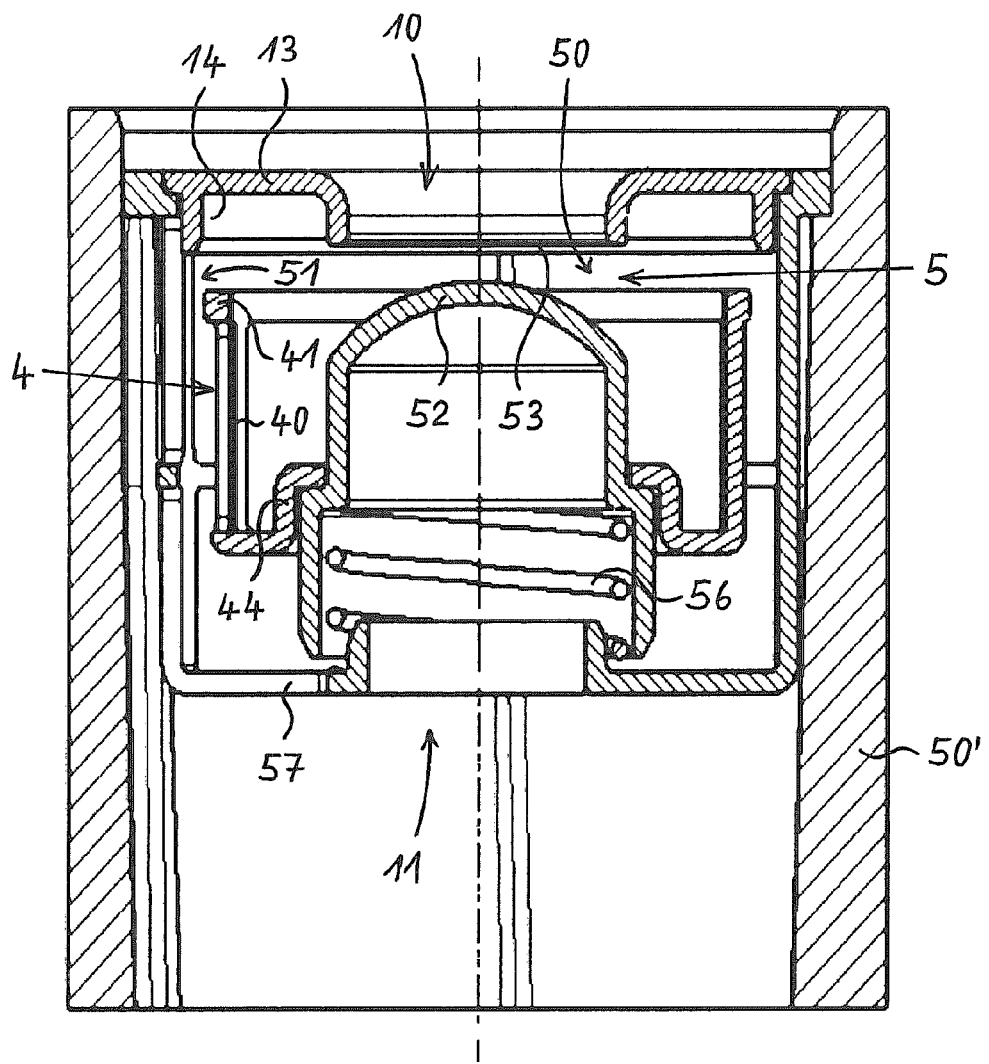
FIG. 3 shows the bypass valve of FIG. 1 in a second opening position, in longitudinal section.

If the medium pressure difference between inflow side 10 and outflow side 11 increases further and exceeds a second boundary value, then valve body 52 is displaced still further away from valve seat 53, against the force of spring 56, as is shown in FIG. 3. This causes an enlargement of the cross-section of bypass flow path 50 between valve body 52 and valve seat 53.

At the same time, sieve element 4 is thereby displaced by the same path together with valve body 52, which has the result that upper end face region 41 of sieve element 4 comes to be situated with an axial spacing from sealing collar 14. In this way, an additional, sieve-free bypass flow path cross-section 51 is cleared between upper end face region 41 and the lower end of sealing collar 14. In this position of bypass valve 5, the medium can flow through bypass valve 5 with a very low flow resistance in order to bypass the associated device, and a removal of dirt particles in order to maintain the supply of medium to downstream components is then done without.

Figure 4:
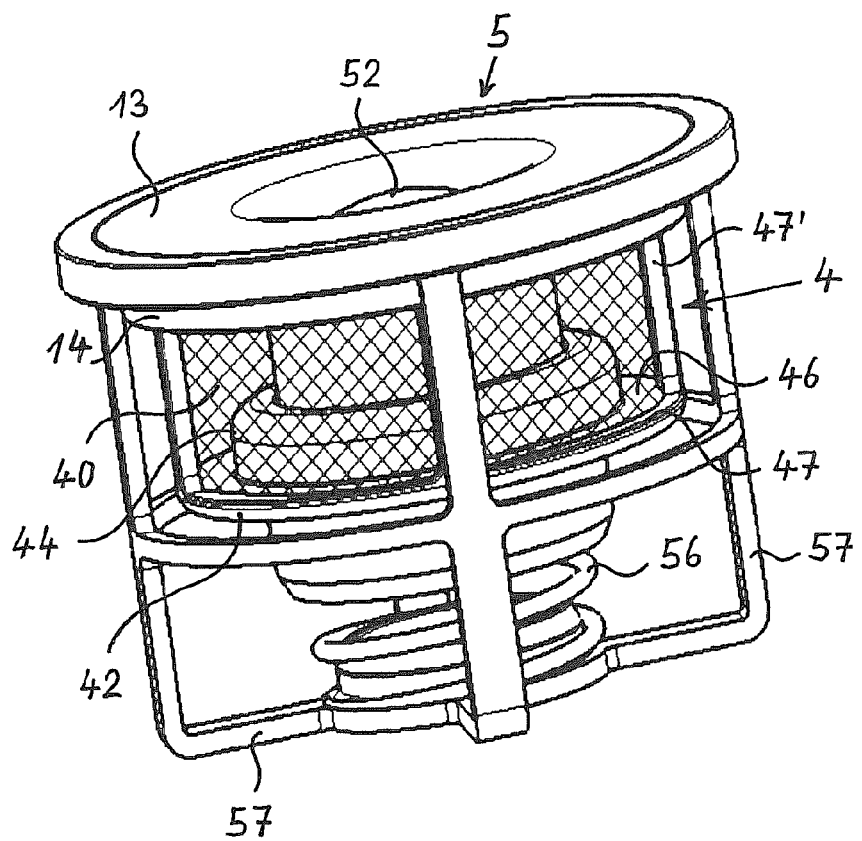
FIG. 4 shows the bypass valve of FIG. 1 as an individual part, in a perspective view.

FIG. 4 shows bypass valve 5 of FIGS. 1 through 3 as an individual part, in a perspective view. At the top in FIG. 4, annular disk-shaped contour 13 can be seen, from which sealing collar 14 extends downward. In its center, contour 13 is perforated, and forms valve seat 53 on its lower side (not visible here). In the center of contour 13, a small part of valve body 52 can be seen, here in its closed position.

Valve cage 57 is connected to contour 13, and said cage guides valve body 52 and sieve element 4 connected therewith, and supports spring 56 at its lower side. With its upper side, spring 56 acts on the lower end of valve body 52, and in this way exerts the preloading force acting in the closing direction.

Sieve element 4 with annular sieve 40 surrounds the upper part of valve body 52 and is placed thereon via clamping ring 44. On the upper end face region (not visible) and on the lower end face region 42 of sieve element 4, there is situated a respective stabilizing reinforcing ring 47. These rings 47 are connected to one another in one-piece fashion via a plurality of reinforcing struts 47' that are distributed in the circumferential direction and that run axially.

FIGS. 5 through 8 of the drawing show a second exemplary embodiment of bypass valve 5 that differs from the first example in that now sieve element 4 is connected to contour 13, and now valve body 52 is movable relative to sieve element 4. In other respects, the second exemplary embodiment corresponds to the first.

Figure 5:
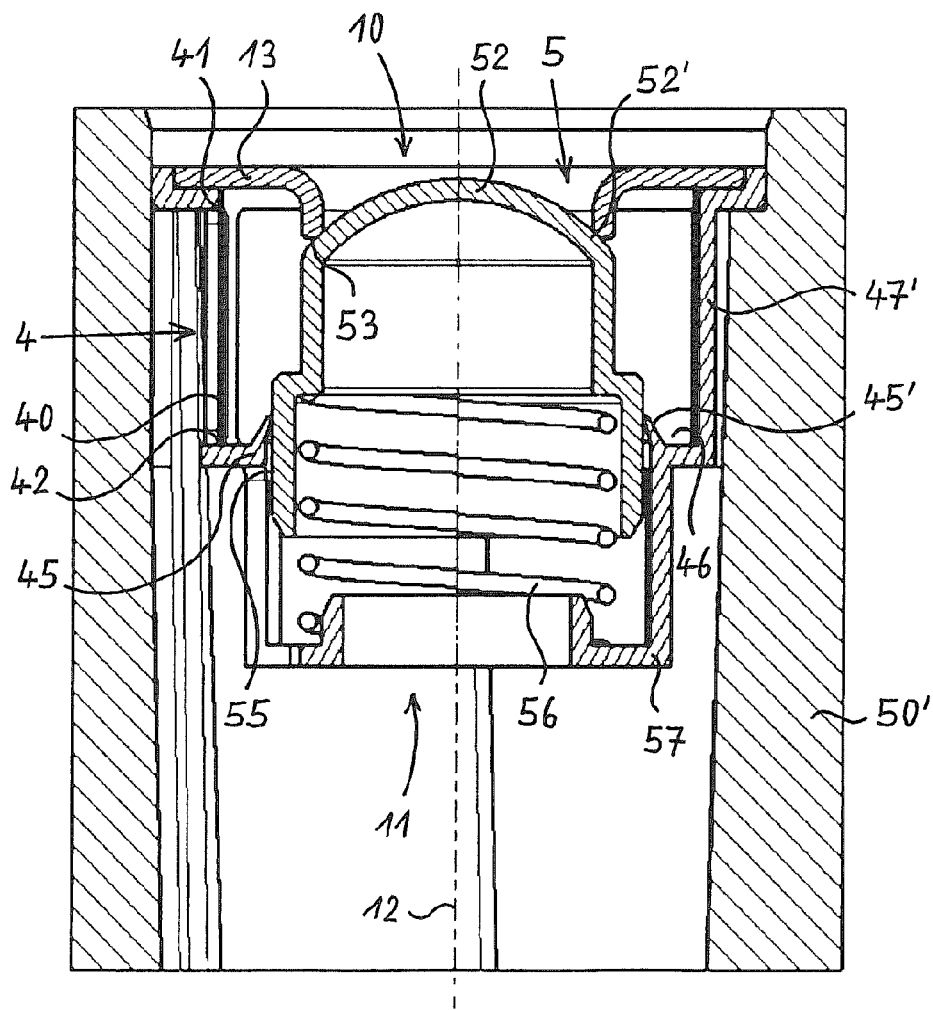
FIG. 5 shows the bypass valve with sieve element in a second embodiment, in the installed state, in the closed position, in longitudinal section.

In FIG. 5, bypass valve 5 is shown in its closed position, in which valve body 52 lies against valve seat 53 on the underside of contour 13 as a result of the force of spring 56. At the same time, a sealing ring region 45, which terminates radially inwardly on lower end face region 42 of sieve element 4, lies with an elastic flexible sealing lip 45' against an outer circumferential region 55 of valve body 52. In the closed state of bypass valve 5 shown in FIG. 5, a flow of medium through the valve is prevented.

Figure 6:
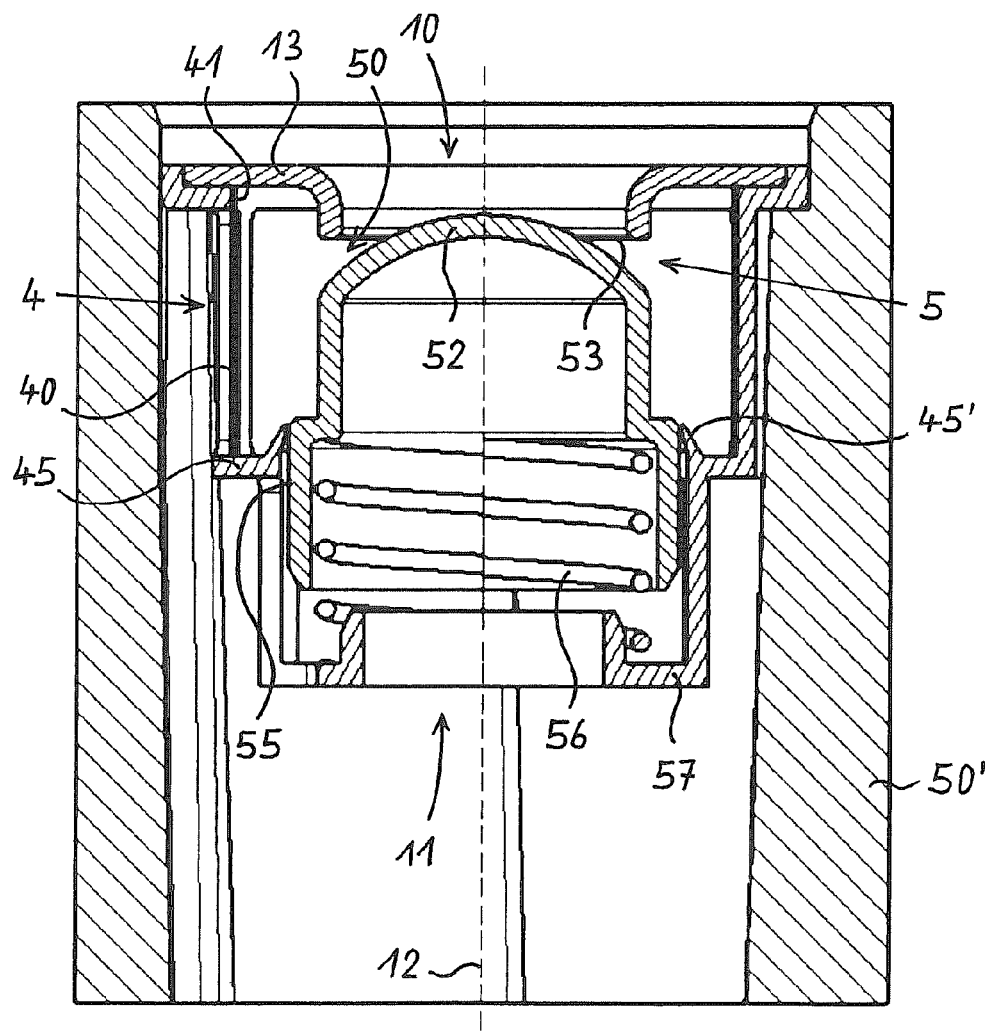
FIG. 6 shows the bypass valve of FIG. 5 in a first opening position, in longitudinal section.

FIG. 6 shows bypass valve 5 in a first opening position that it assumes when a medium pressure difference between inflow side 10 and outflow side 11 exceeds a specifiable first boundary value. The force produced by the pressure difference displaces valve body 52, against the force of spring 56, away from valve seat 53 in the axial direction, thereby releasing a bypass flow path 50. At the same time, in this first opening position sealing lip 45' of sieve element 4 is still seated in sealing fashion on outer circumferential region 55 of valve body 52. In this way, the entire medium flow flowing through bypass flow path 50 flows through annular sieve 40 of sieve element 4, with the result that at least coarser dirt particles are removed from the medium flow.

Figure 7:
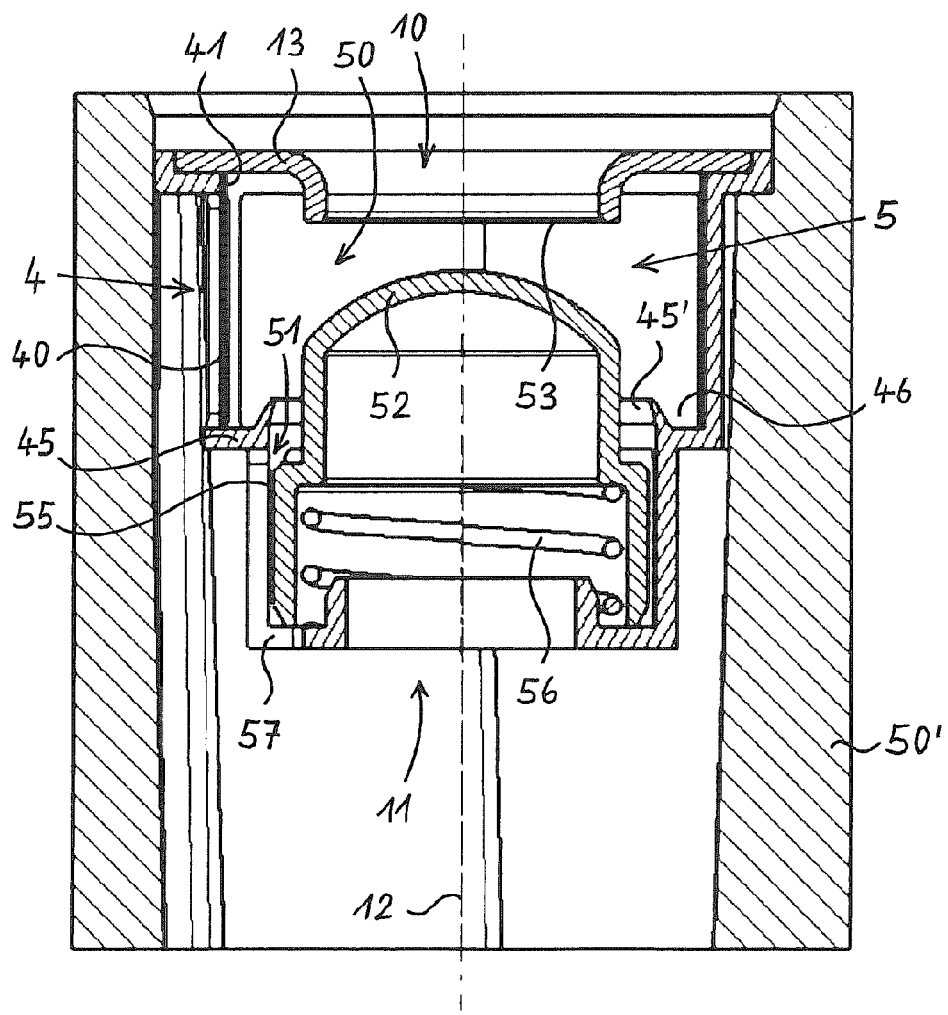
FIG. 7 shows the bypass valve of FIG. 5 in a second opening position, in longitudinal section.

FIG. 7 shows bypass valve 5 in a second open position that it assumes when the medium pressure difference between inflow side 10 and outflow side 11 exceeds a second, higher boundary value. As a result, valve body 52 is displaced still further in the opening direction, against the force of spring 56, thereby releasing an enlarged bypass flow path 50. At the same time, circumferential region 55 of valve body 52 now comes to be situated at an axial distance from sealing lip 45' of sieve element 4, thus additionally releasing a sieve-free bypass flow path cross-section 51 between valve body 52 and sieve element 4. Along this path, the medium can now flow through bypass valve 5 with very low flow resistance, with no removal of dirt particles.

Figure 8:
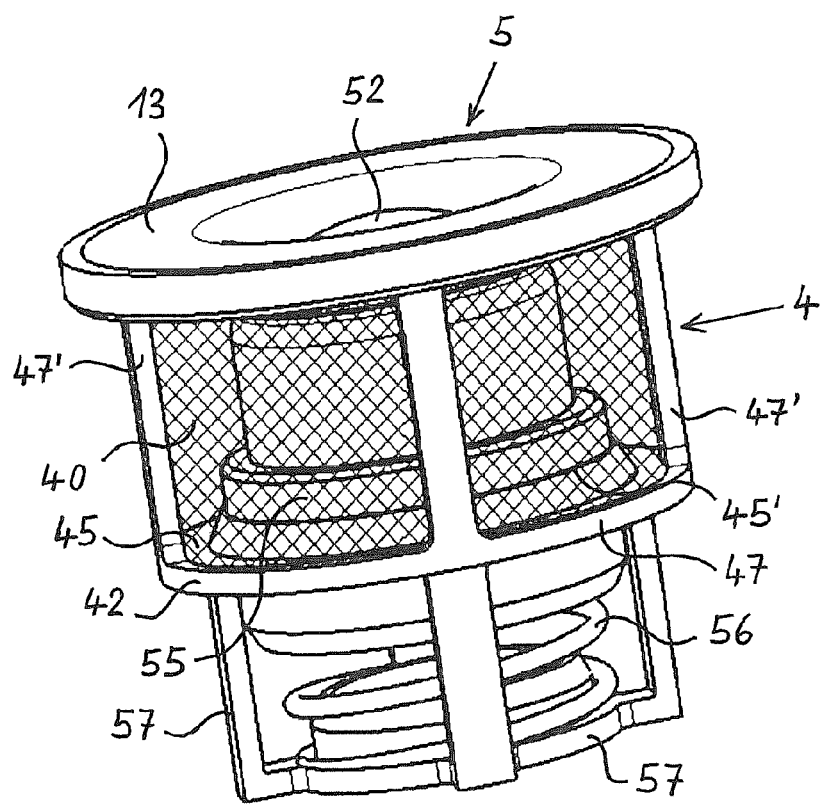
FIG. 8 shows the bypass valve of FIG. 5 as an individual part, in a perspective view.

FIG. 8 shows bypass valve 5 of FIGS. 5 through 7 as an individual part, in a perspective view. At the top in FIG. 8, disk-shaped contour 13 is visible with its central perforation, forming the valve seat, in which the upper end region of valve body 52 is seated, in its closed position shown in FIG. 8. Grid-type valve cage 57 is connected to contour 13, said cage surrounding valve body 52 and supporting spring 56 at its lower end. The upper end of spring 56 here also acts on the lower side of valve body 52 in order to preload this body with a force acting in the closing direction.

Sieve element 4 is situated with hollow cylindrical annular sieve 40 surrounding the upper region of valve body 52, sieve element 4 here being connected to contour 13. From lower end face region 42 of sieve element 4, the sealing ring region 45 thereof extends radially inwardly with sealing lip 45'. In the closed state shown in FIG. 8, sealing lip 45' is seated in sealing fashion on outer circumferential region 55 of valve body 52, valve body 52 being capable of being displaced in the axial direction relative to sealing lip 45' and to the other sieve element 4. For the mechanical reinforcement of annular sieve 40, here as well a lower reinforcing ring 47 is used, as well as a plurality of reinforcing struts 47' distributed circumferentially and running in the axial direction, made in one piece with reinforcing ring 47.

All parts of bypass valve 5, except spring 56, can advantageously be made as injection-molded parts made of plastic, enabling low-cost mass production.

Figure 9:
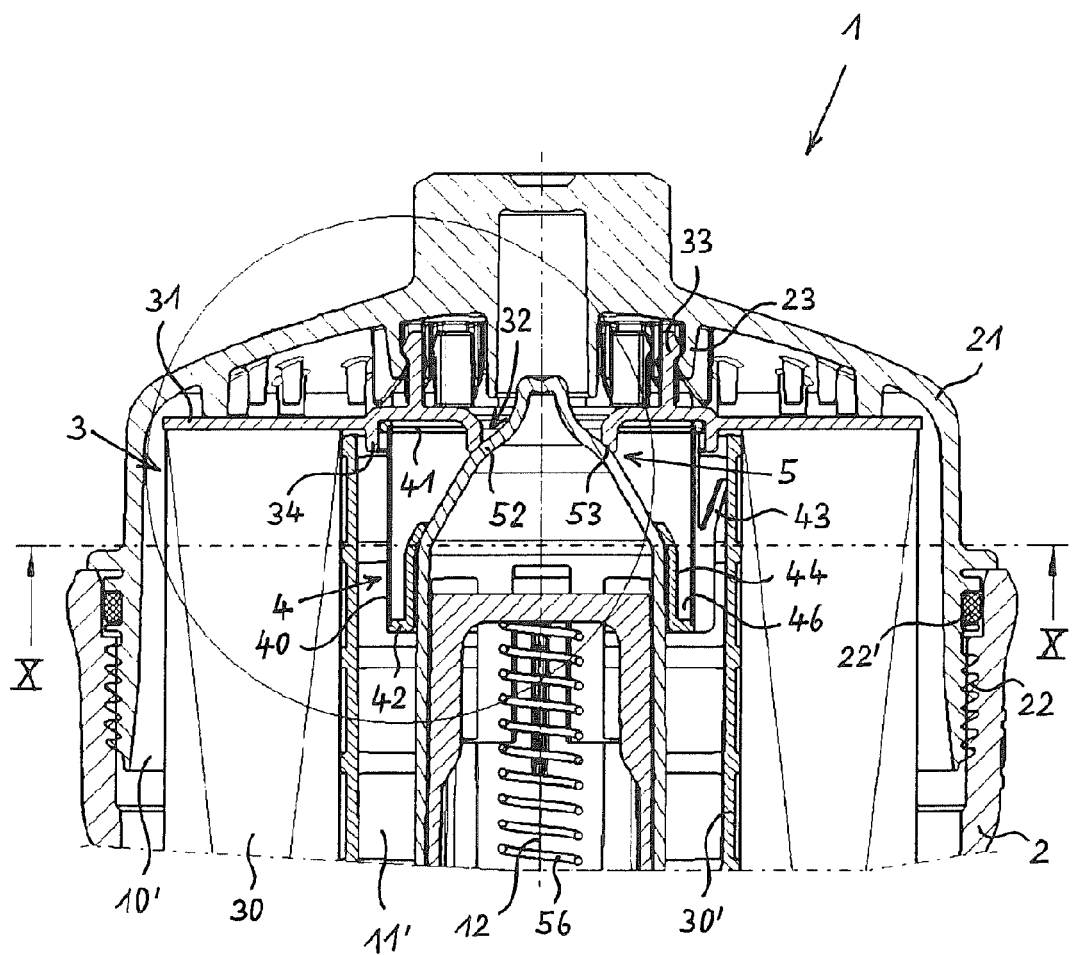
FIG. 9 shows a liquid filter having a filter bypass valve and a sieve element in a first embodiment, in a partial longitudinal section.

FIG. 9 of the drawing shows a liquid filter 1 having a filter bypass valve 5 and a sieve element 4 in a partial longitudinal section through the upper region of filter 1. Outwardly, liquid filter 1 is limited by a filter housing 2 having a basic cup shape, only a small part of which is visible here, and which is sealed in liquid-tight fashion at its upper side by a screw cover 21, via a screw connection 22 having a seal 22'. For the purpose of exchanging a filter insert 3 situated in filter housing 2, cover 21 can be unscrewed, thus opening filter housing 2.

Filter insert 3 is made up of a hollow cylindrical filter material body 30, here formed as a filter material strip folded in a zigzag shape. At its ends, filter material body 30 is enclosed by two end plates 31, of which only the upper one is visible here. In the hollow interior of filter material body 30, there is situated a grid-type supporting body 30' that, during operation of liquid filter 1, supports filter material body 30 against collapse in the radial direction from outside to inside, when the liquid to be filtered flows through it.

Accordingly, in this liquid filter 1 raw side 10' is situated radially externally to filter material body 30 and above end plate 31 of filter insert 3, and clean side 11' is situated radially inwardly from filter material body 30 and support body 30', in the hollow interior of filter insert 3.

Upper end plate 31 has a central, circular perforation 32 that forms a valve seat 53 of filter bypass valve 5. On the upper side of end plate 31, there are integrally formed a plurality of locking tongues 33, radially external to perforation 32 and distributed in the circumferential direction, which interact in locking fashion with a locking ring 23 on the underside of cover 21. In the locked-together state, when cover 21 is unscrewed from housing 2 it carries filter insert 3 along with it out of housing 2.

Further radially outward from central perforation 32, concentric thereto, a circumferential sealing collar 34 extends axially downward from upper end plate 31, into the hollow interior of filter material body 30 and of support body 30'.

In the hollow interior of filter insert 3, a valve body 52 is guided in axially displaceable fashion as a part of filter bypass valve 5, and is preloaded with a force by a helical spring 56, in its closing direction, i.e. upward according to FIG. 9. For this purpose, the upper end of spring 56 is supported on an inner part of valve body 52, and its lower part (not visible here) is supported on a part of filter housing 2.

A downward-pointing edge of central perforation 32 in upper end plate 31 is fashioned as valve seat 53 for valve body 52, in order in this way to form filter bypass valve 5.

Between an upper part of valve body 52 and an upper part of the hollow interior of filter insert 3 there is situated a sieve element 4. Sieve element 4 is essentially made up of a hollow cylindrical annular sieve 40 whose diameter is greater than the outer diameter of valve body 52 and smaller than the inner diameter of support body 30'. A first, upper end face region 41 of sieve element 4 is guided in axially displaceable fashion and in sealing fashion in sealing collar 34 of end plate 31. A clamp ring 44 is connected to a second, lower end face region 42 of sieve element 4, said clamp ring being placed onto valve body 52 with a clamping seating whereby sieve element 4 is connected adequately firmly to valve body 52 but can be detached as needed. In this way, sieve element 4 is here axially movable together with valve body 52.

On its outer circumference, sieve element 4 has a plurality of guide and centering ribs 43, of which one is visible at the right in FIG. 9. These guide and centering ribs 43 hold and guide sieve element 4 precisely concentric to sealing collar 34 during its axial movement together with valve body 52. In the axially lower region of sieve element 4, between the lower part of annular sieve 40 and clamp ring 44 there is formed a dirt particle collecting region 46 in which dirt particles removed from a liquid stream by sieve element 4 during operation of liquid filter 1 can collect and be deposited. Valve body 52 is also guided in filter housing 2 in axially displaceable and centered fashion via guide means that are not separately shown here.

In FIG. 9, filter bypass valve 5 is shown in its closed position, which it assumes in normal operation of liquid filter 1, i.e. as long as the pressure difference between raw side 10' and clean side 11' does not exceed a specified boundary value. The stream of liquid to be filtered then flows in its entirety from raw side 10' through filter material body 30, in the radial direction from outside to inside, to clean side 11', from where there goes out an outlet (not visible here) for the filtered liquid.

Figure 10:
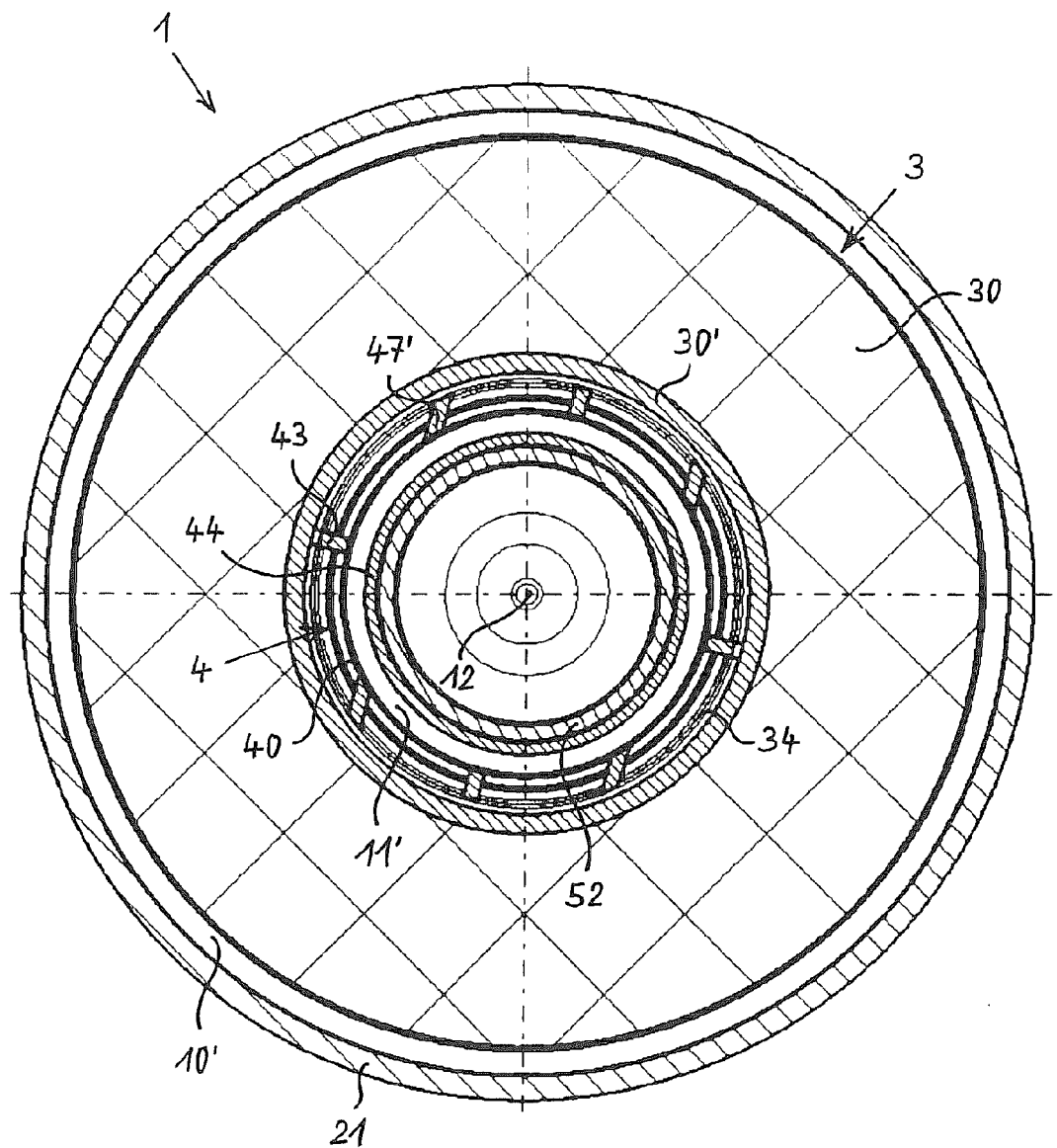
FIG. 10 shows the liquid filter of FIG. 9 in cross-section along the sectional line X-X in FIG. 9.

FIG. 10 shows liquid filter 1 of FIG. 9 in cross-section according to the line X-X in FIG. 9. At the radial outer limit, cover 21 is visible, and radially inward therefrom is situated raw side 10' of filter 1. Further inward radially there follows, as next element, filter material body 30 of filter insert 3. Radially inward from filter material body 30 is situated support body 30', followed inwardly by sieve element 4, of which annular sieve 40 and guide and centering ribs 43 connected thereto are here visible in section. Clean side 11' of filter 1 is also situated in this region. Further radially inward there follow, first, clamp ring 44 of sieve element 4, and, finally, valve body 52, in section. Longitudinal mid-axis 12 of liquid filter 1 runs through the center, perpendicular to the plane of the drawing.

Figure 11:
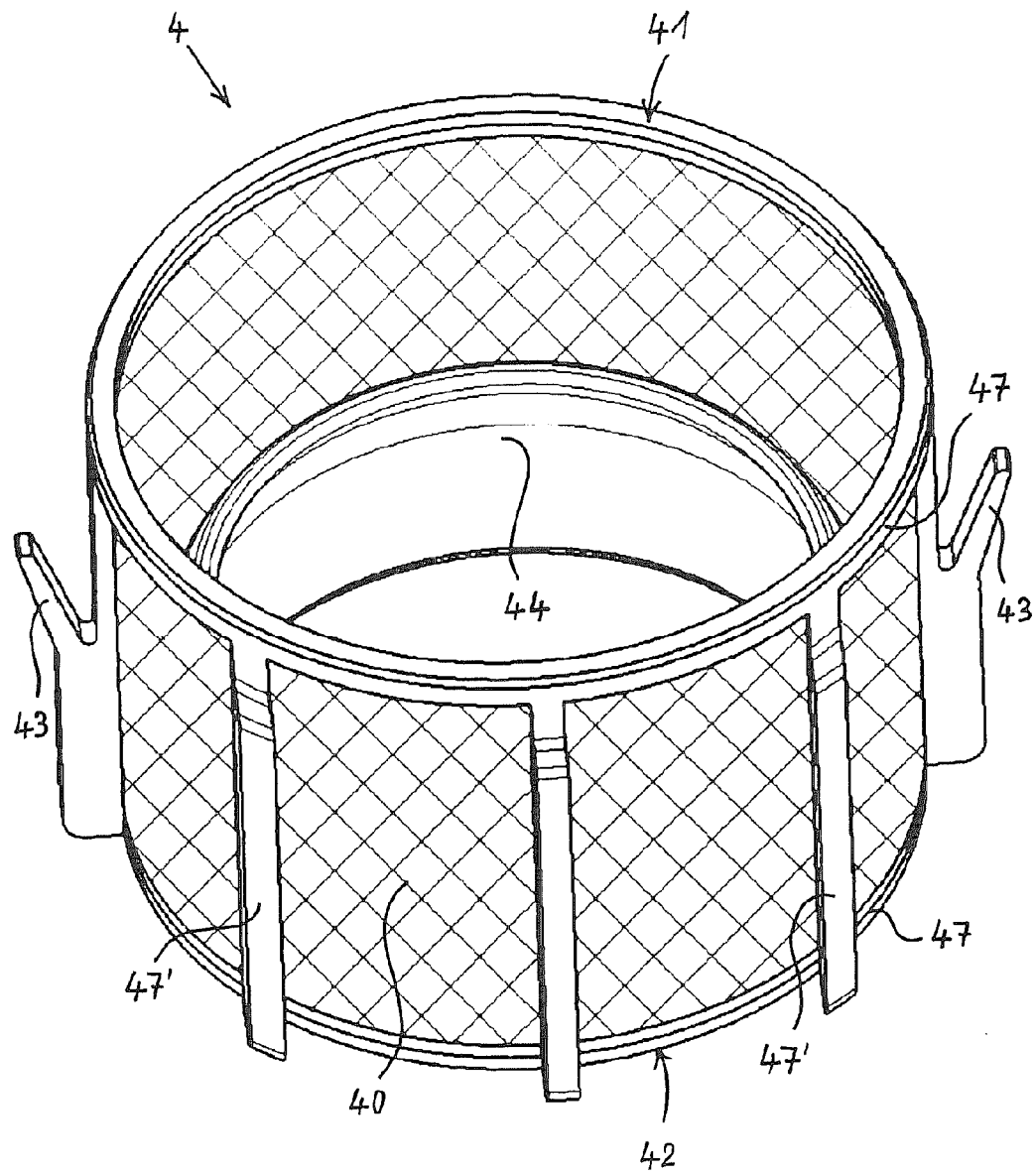
FIG. 11 shows the sieve element of the liquid filter of FIG. 9 as an individual part, in a perspective view.

In FIG. 11, sieve element 4 of liquid filter 1 of FIG. 9 is shown as an individual part, in a perspective view. Sieve element 4 is made up of hollow cylindrical annular sieve 40, which at the top has its first end face region 41 and at the bottom has its second end face region 42. For the mechanical stabilization of sieve element 4, it has an upper and a lower reinforcing ring 47, as well as a plurality of reinforcing struts 47' distributed around the circumference and running axially between reinforcing rings 47. Guide and centering ribs 43 are integrally formed in one piece with a part of reinforcing struts 47'.

In the interior of sieve element 4, at bottom its clamp ring 44 is visible, which connects sieve element 4 with the valve body (not shown here).

Figure 12:
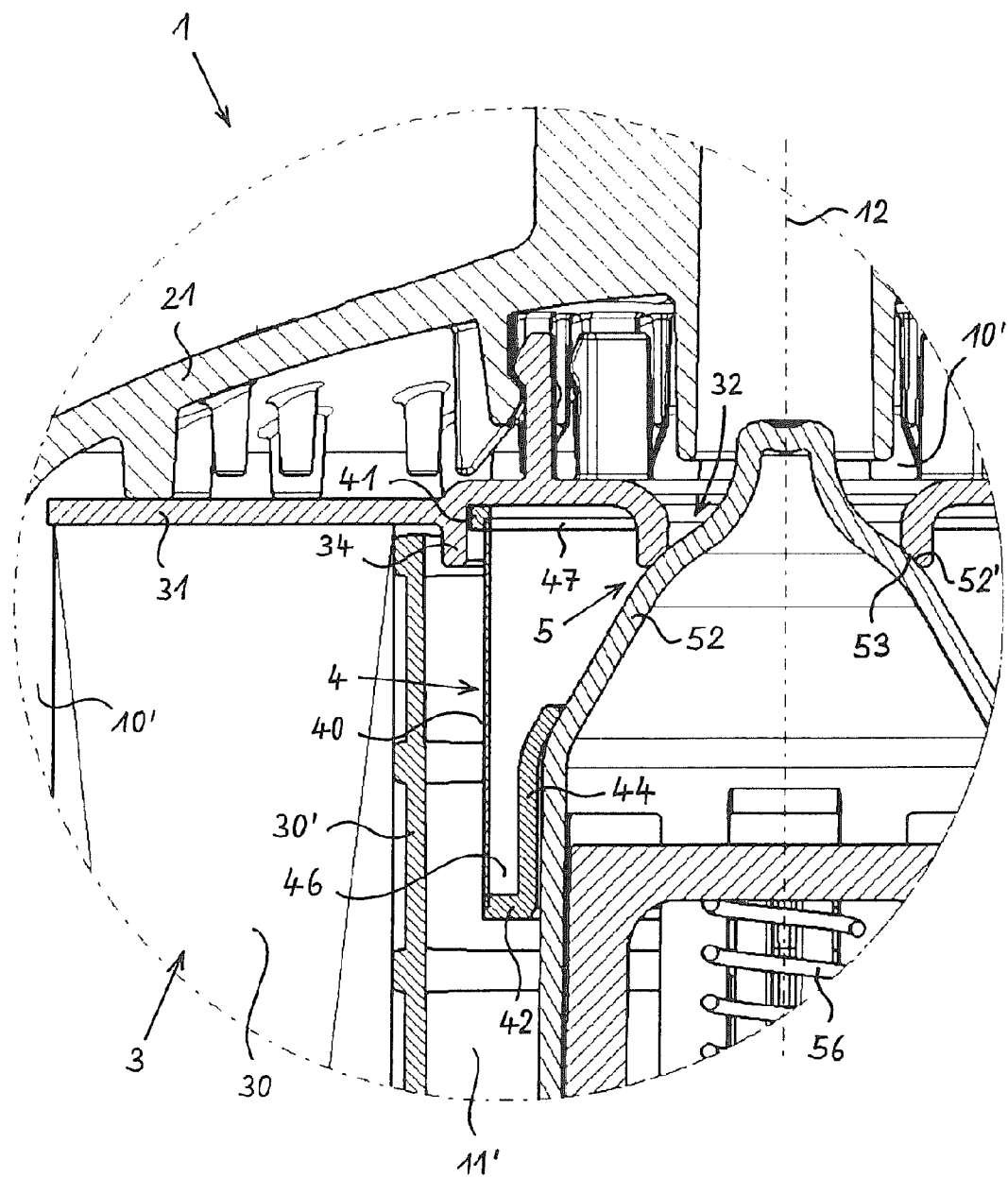
FIG. 12 shows the segment, circled in FIG. 9, of the liquid filter having the filter bypass valve in the closed position, in an enlarged sectional view.

FIG. 12 shows the segment circled in FIG. 9 in an enlarged sectional representation. In FIG. 12 as well, filter bypass valve 5 is in its closed position, which it assumes as long as a pressure difference between raw side 10' and clean side 11' is smaller than a specifiable boundary value. In this closed position, due to the preloading force produced by spring 56 valve body 52 is in its uppermost position, in which its sealing region 52' lies in sealing fashion on valve seat 53, which is formed by the lower edge of central perforation 32 of upper end plate 31. At the same time, sieve element 4, connected to valve body 52, is in its uppermost position with its upper end face region 41 inside sealing collar 34. An immediate flow connection from raw side 10' to clean side 11' via filter bypass valve 5 is now blocked, and a liquid flowing through liquid filter 1 flows entirely through filter material body 30 from raw side 10' to clean side 11'.

Figure 13:
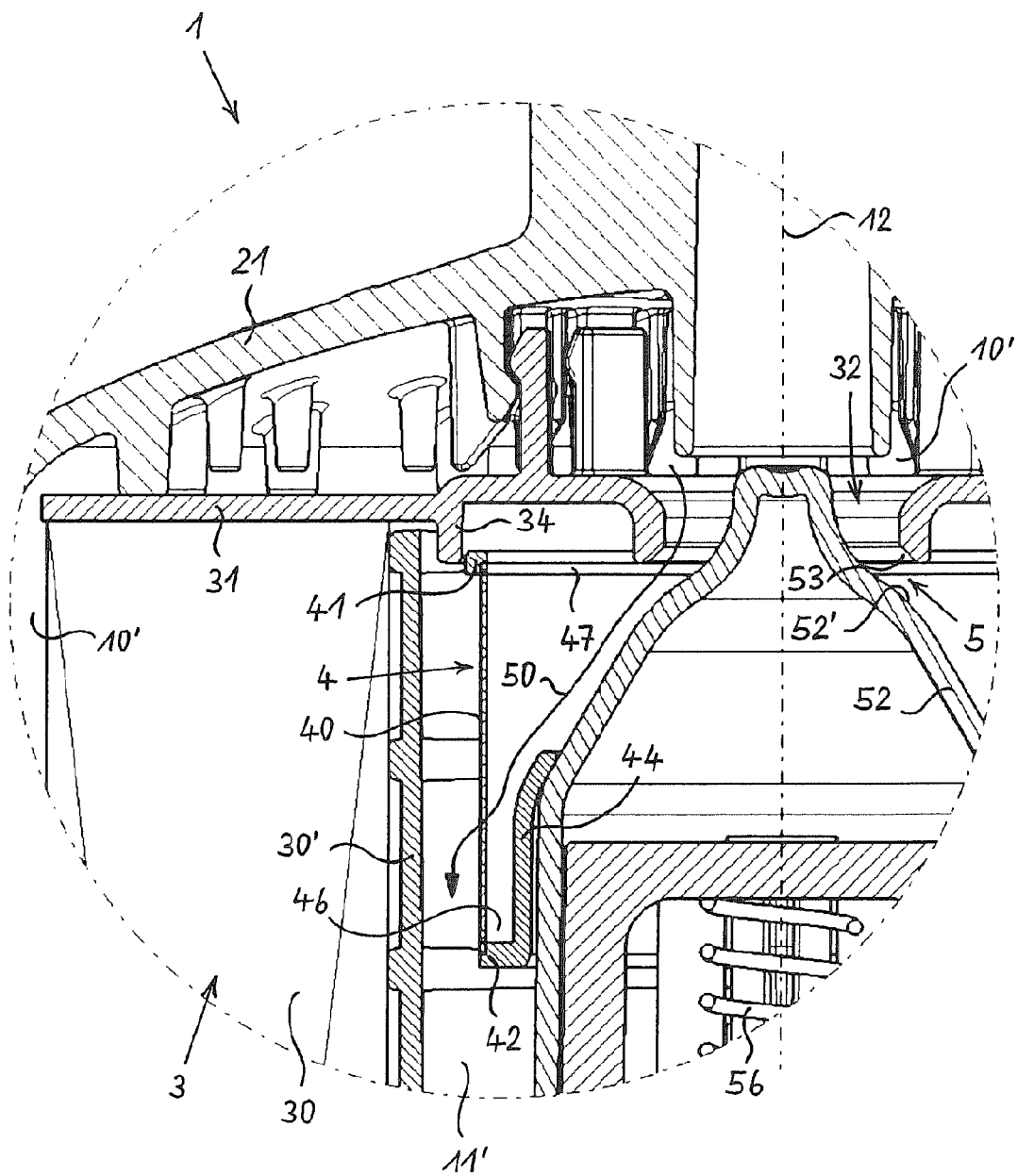
FIG. 13 shows the segment according to FIG. 12, now with the filter bypass valve in a first open position.

FIG. 13 shows the state of bypass valve 5 that it assumes when the pressure difference between raw side 10' and clean side 11' exceeds a first specifiable boundary value, but is still below a higher, second boundary value. This state occurs in particular when filter material body 30 is clogged by dirt particles. In this state, valve body 52 is displaced downward, i.e. in the opening direction, by the liquid pressure difference, against the force of spring 56, into a first opening position region. Valve body 52 is now lifted off from valve seat 53 with its sealing region 52', while however at the same time upper end face region 41 of sieve element 4 remains in sealing seating with sealing collar 34, here the lower end region thereof. In this state of filter bypass valve 5, a bypass flow path 50 is released that runs from raw side 10' through now-open filter bypass valve 5 and through annular sieve 40 of sieve element 4 to clean side 11'. It is true that in this state the liquid bypasses filter material body 30; however, due to sieve element 4 there still takes place at least a separation of coarser dirt particles from the liquid stream, so that at least partly cleaned fluid is supplied to components downstream from liquid filter 1, even if filter material body 30 is clogged by dirt particles trapped therein.

Figure 14:
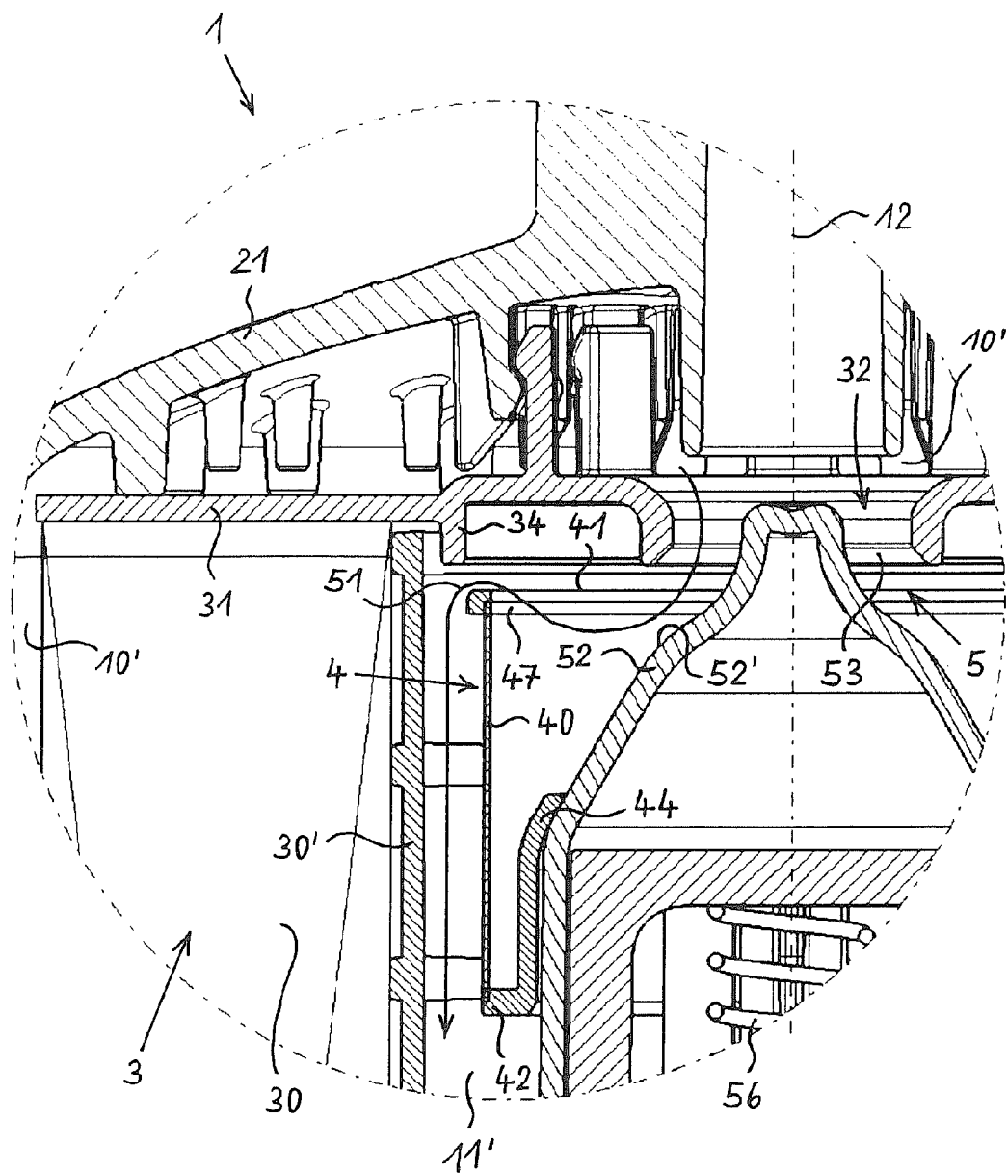
FIG. 14 shows the segment according to FIG. 12, now with the filter bypass valve in a second open position.

FIG. 14 shows the state of filter bypass valve 5 that it assumes when there occurs a still higher pressure difference between raw side 10' and clean side 11'. This still higher pressure difference occurs in particular when not only filter material body 30, but also annular sieve 40 of sieve element 4, is clogged by dirt particles. The further increased pressure difference results in a further displacement of valve body 52 in the opening direction, against the force of spring 56, whereby at the same time sieve element 4, connected to valve body 52, is also moved further in the opening direction, i.e. downward and away from upper end plate 31. This further movement has the result that upper end face region 41 of sieve element 4 moves out of engagement with sealing collar 34, and is then situated at an axial distance therefrom. This releases a sieve-free bypass flow path cross-section 51 via which liquid can move from raw side 10' immediately to clean side 11' without flowing through filter material body 30 and annular sieve 40. In this way, a supply of liquid to downstream components, even if with uncleaned fluid, is still ensured even if both filter material body 30 and sieve element 4 are clogged by dirt particles.

Figure 15:
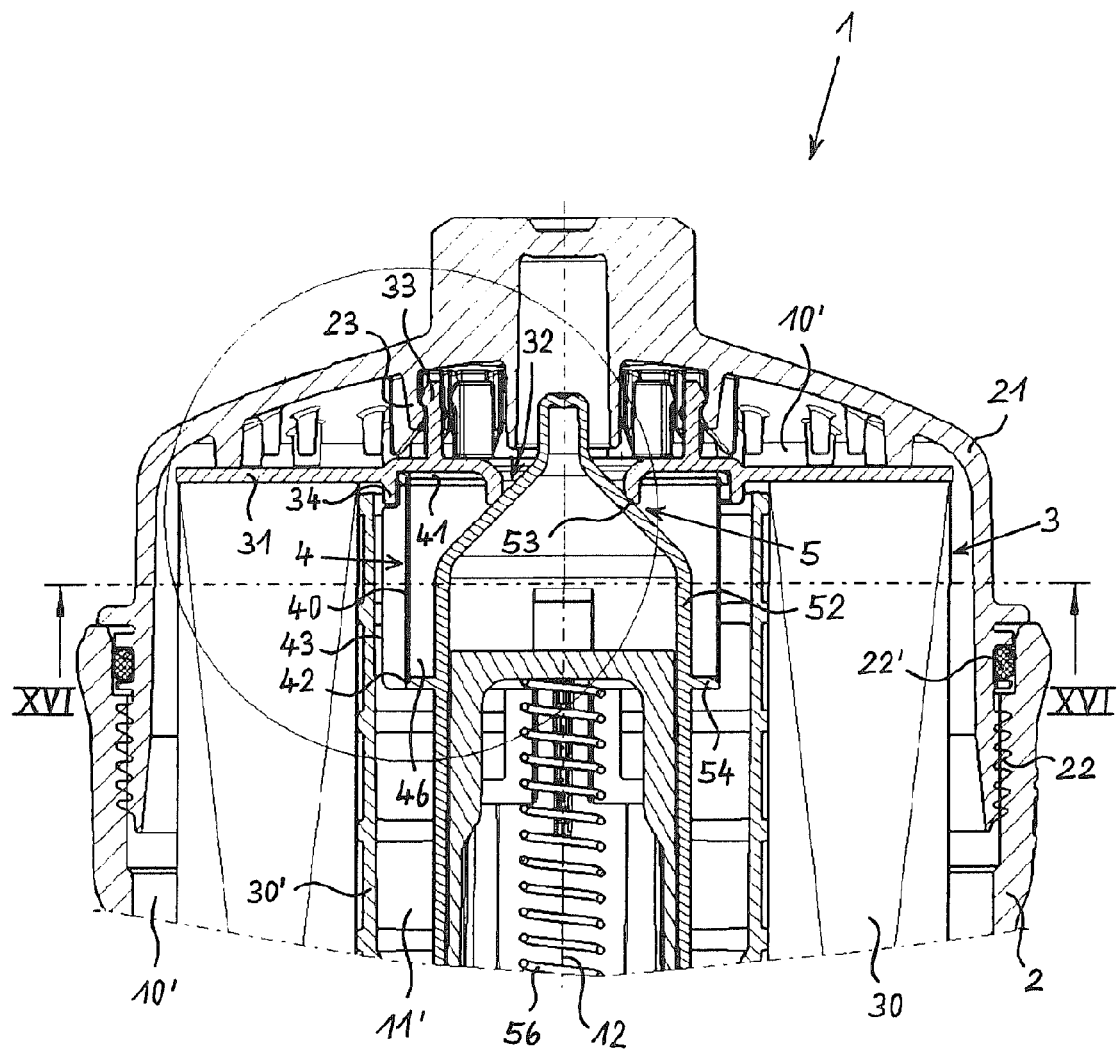
FIG. 15 shows the liquid filter with filter bypass valve and sieve element in a second embodiment, in a partial longitudinal section.

FIG. 15 of the drawing shows liquid filter 1 in a second embodiment, again in a partial longitudinal section through the upper part of filter 1. Filter housing 2 with screw cover 21, filter insert 3, its support body 30', and filter bypass valve 5 agree with the embodiment described above. With regard to the reference characters referring thereto in FIG. 15, reference is made to the preceding description.

The difference here is the type of connection of sieve element 4 to valve body 52, because in the example of FIG. 15 a fixed connection is now present. For this purpose, valve body 52 has, at an axial distance from its upper end and situated radially outwardly, an annular sieve bearer 54 that is integrally formed in one piece thereon and that protrudes. Fixedly connected to the radial outer edge thereof, for example by welding or gluing, is lower end face region 42 of annular sieve 40 of sieve element 4.

On its upper end face region 41, sieve element 4 again has reinforcing ring 47, which cooperates in radially sealing fashion and in axially movable fashion with the inner circumference of sealing collar 34 on the underside of upper end plate 31. Here as well, guide and centering ribs 43 are provided radially outwardly on sieve element 4, one of these ribs being visible at left in FIG. 15. An annular gap formed between the outer circumference of valve body 52 and the lower region of annular sieve 40 here also provides a dirt particle collecting region 46. Valve body 52 is also of course displaceable in the axial direction, and is held in centered fashion in filter housing 2.

Figure 16:
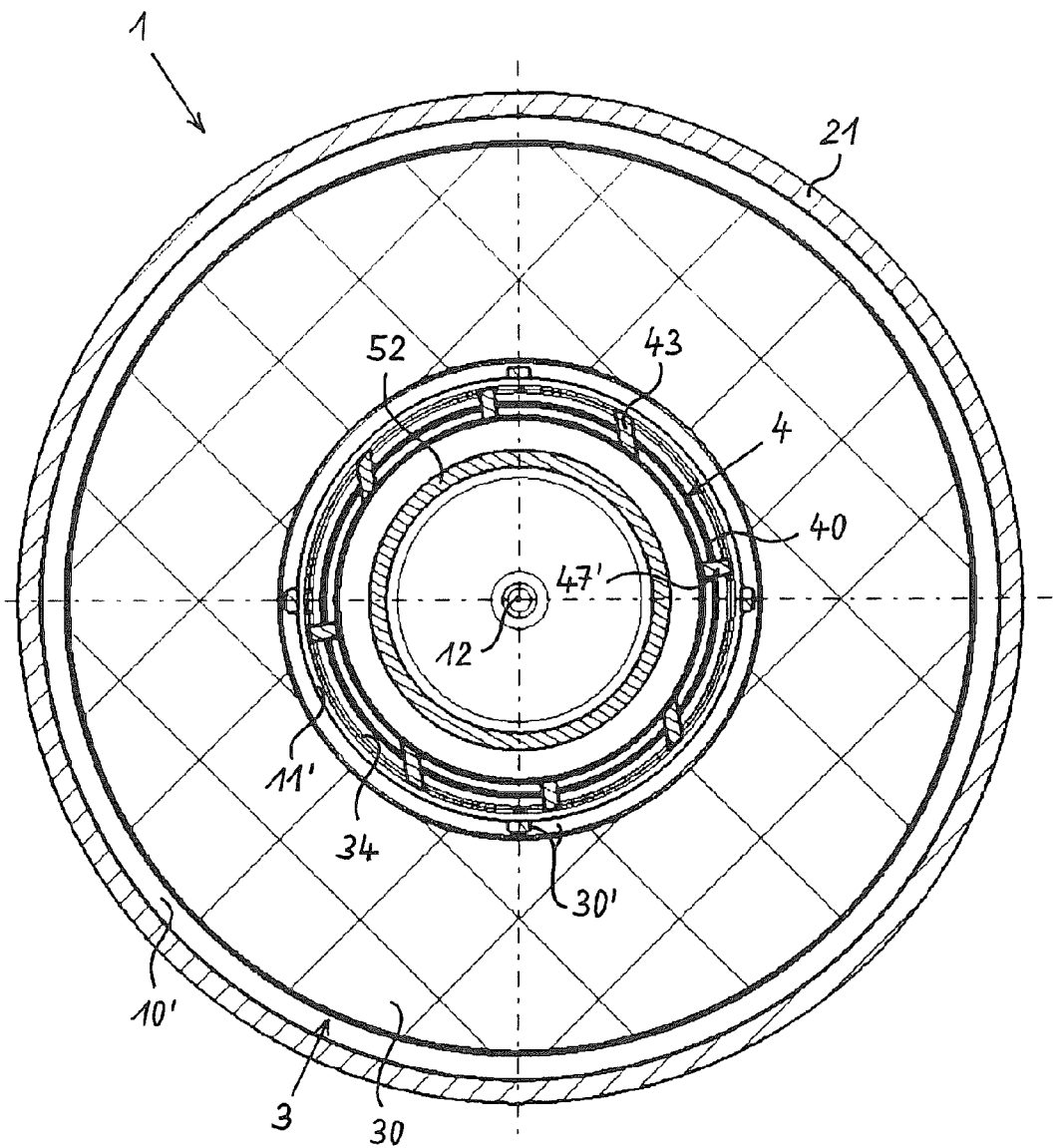
FIG. 16 shows the liquid filter of FIG. 15 in cross-section according to sectional line XVI-XVI in FIG. 15.

FIG. 16 shows a cross-section through liquid filter 1 according to the line XVI-XVI in FIG. 15. Cover 21 is situated radially outwardly; radially inwardly therefrom is situated raw side 10' of filter 1. Radially inwardly therefrom there is situated filter insert 3 with filter material body 30, supported radially inwardly by support body 30'. Further radially inwardly there follows sieve element 4 having annular sieve 40, and having guide and centering ribs 43, and having reinforcing struts 47'. Between support body 30' and annular sieve 40, in the background the end face of sealing collar 34 can be seen. Clean side 11' of filter 1 is also situated in this area. Still further inward radially, finally, valve body 52 is seen in section, through whose center longitudinal mid-axis 12 of filter 1 runs, perpendicular to the plane of the drawing.

Figure 17:
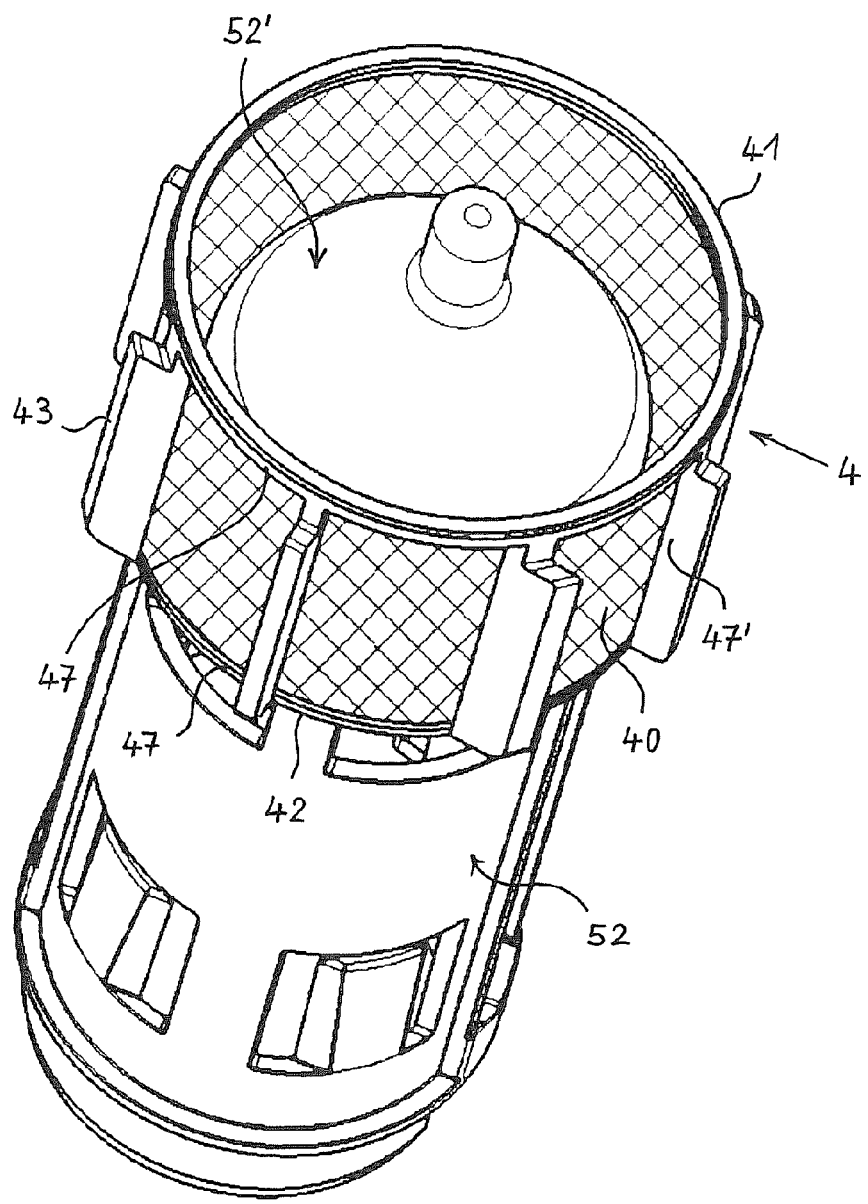
FIG. 17 shows the sieve element together with a valve body of the liquid filter of FIG. 15, as an individual part, in a perspective view.

FIG. 17 shows a perspective view of valve body 52 together with sieve element 4 connected thereto. Valve body 52 has an essentially cylindrical basic shape, and has at its upper end region the sealing region 52', which works together with the associated valve seat. Sieve element 4 includes hollow cylindrical annular sieve 40, which has upward-pointing first end face region 41 and downward-pointing second end face region 42. The upper and lower edge of annular sieve 40 are each mechanically stabilized by a respective reinforcing ring 47. Between the two reinforcing rings 47 run axial reinforcing struts 47', distributed around the circumference, whose radially external region at the same time forms guide and centering ribs 43. In lower end face region 42, sieve element 4 is fixedly connected to valve body 52 via the sieve bearer (not shown), which is fashioned in one piece with valve body 52.

Figure 18:
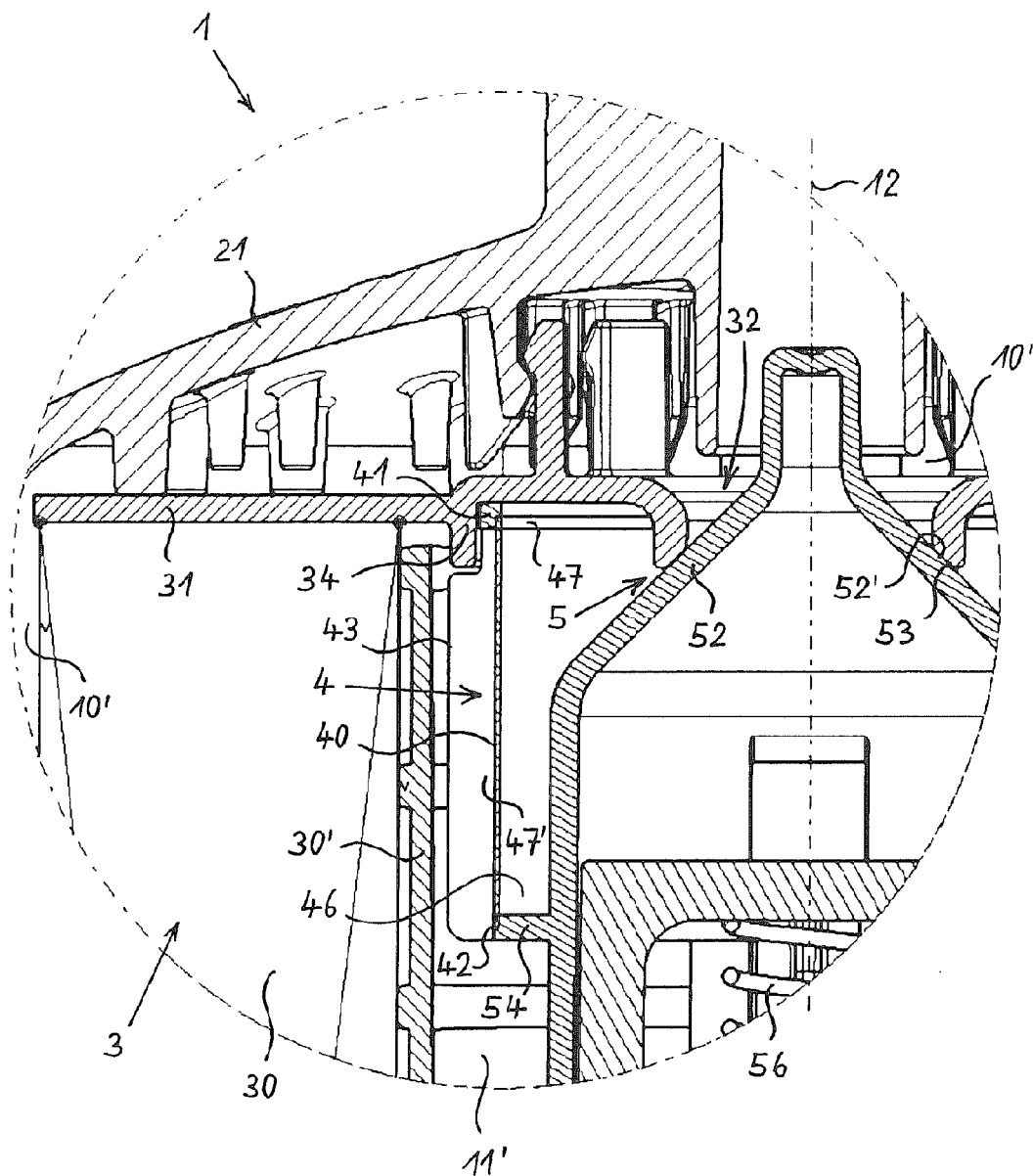
FIG. 18 shows the segment circled in FIG. 15 of the liquid filter with the filter bypass valve in the closed position, in an enlarged sectional view.

FIG. 18 shows the region of liquid filter 1 circled in FIG. 15 in an enlarged representation, filter bypass valve 5 here being in its closed position. In the closed position of valve 5, sealing region 52' of valve body 52 lies in sealing fashion on valve seat 53 of end plate 31, under the action of spring 56. At the same time, upper end face region 41 of sieve element 4 lies in sealing fashion with its upper reinforcing ring 47 on the inner circumference of sealing collar 34 on the underside of upper end plate 31. An immediate flow connection from raw side 10' to clean side 11' of liquid filter 1 is here blocked; the liquid stream flowing through liquid filter 1 flows only through filter material body 30 of filter insert 3, from raw side 10' to clean side 11'.

Figure 19:
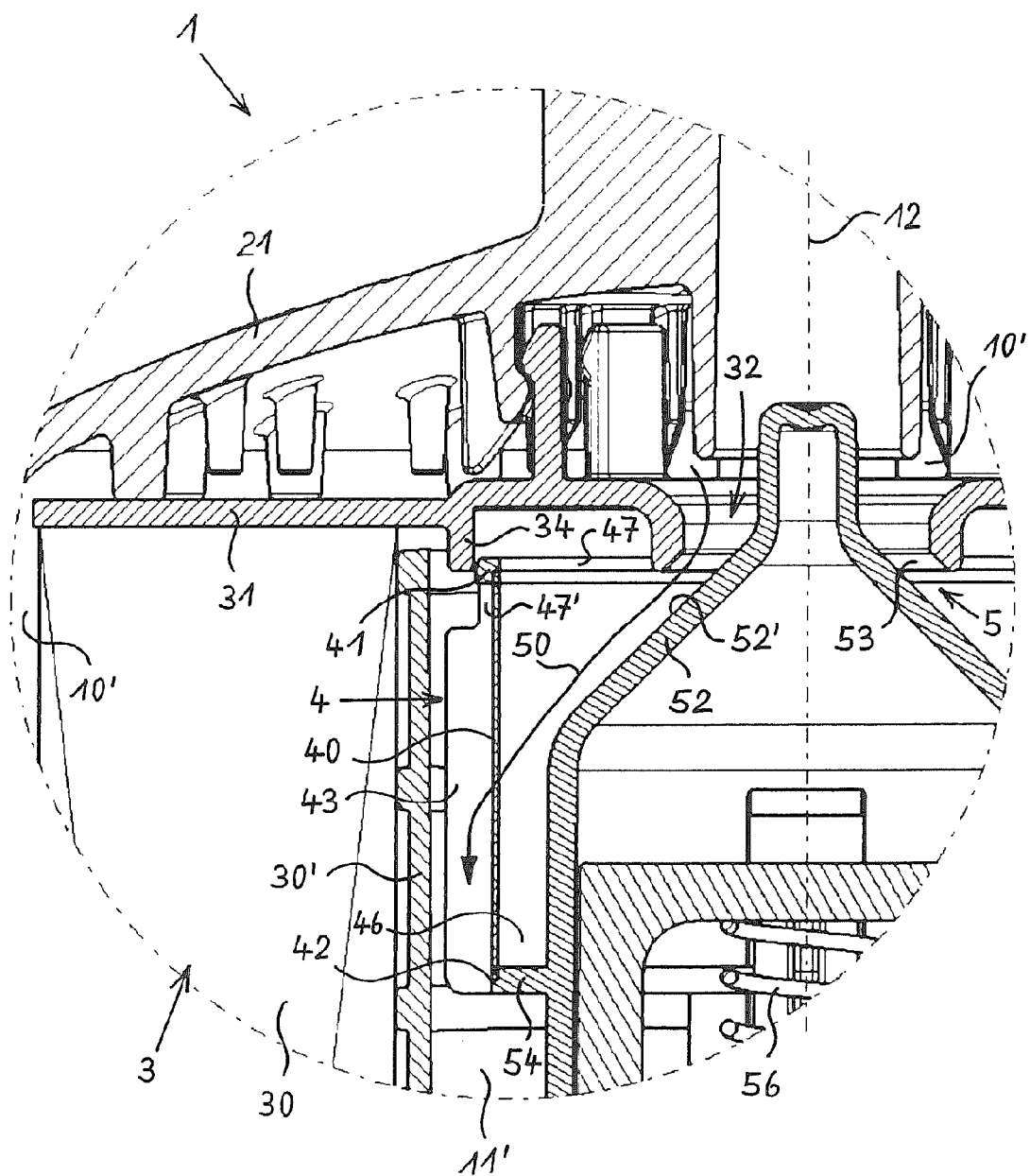
FIG. 19 shows the segment according to FIG. 18, now with the filter bypass valve in a first open position.

When the liquid pressure difference between raw side 10' and clean side 11' exceeds a first specifiable boundary value, valve body 52 is displaced in the opening direction against the force of spring 56, thereby opening filter bypass valve 5. Together with valve body 52, sieve element 4 connected thereto is displaced in the same direction by the same distance; in the first opening state shown in FIG. 19, upper end face region 41 of sieve element 4 remains in sealing seating on the inner circumference of sealing collar 34. In this way, a bypass flow path 50 through filter bypass valve 5 and through annular sieve 40 of sieve element 4 is now released.

Figure 20:
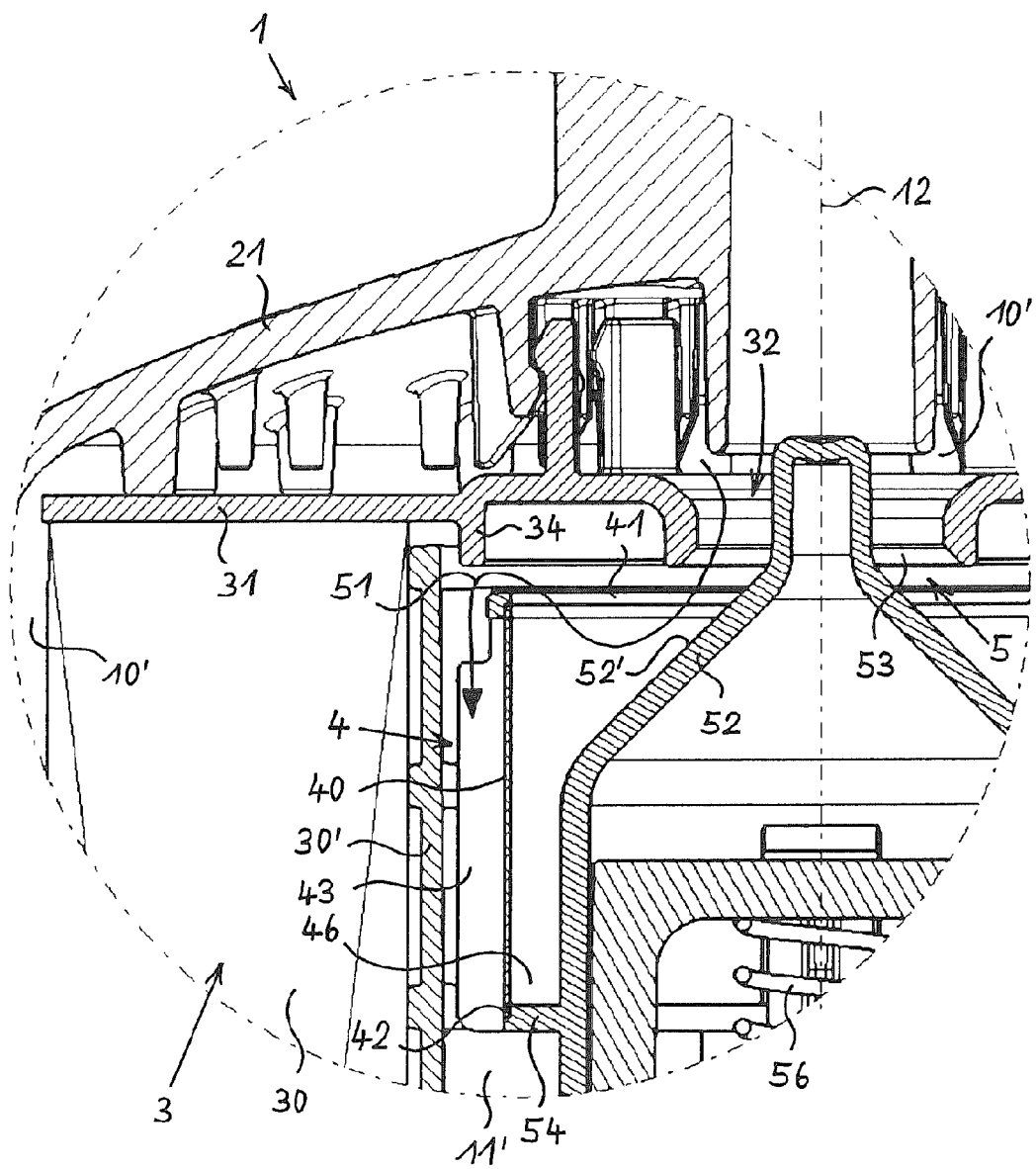
FIG. 20 shows the segment according to FIG. 18, now with the filter bypass valve in a second open position.

If the liquid pressure difference between raw side 10' and clean side 11' increases still further, past a second specifiable boundary value, valve body 52 is displaced still further in the opening direction, against the force of spring 56, until it reaches the position shown in FIG. 20. Sieve element 4 is moved together with valve body 52, causing its upper end face region 40 to move out of engagement with sealing collar 34 and to be brought into a position at an axial distance therefrom. In this way, an additional sieve-free bypass flow path cross-section 51 is now released that enables a supply of liquid, though uncleaned, to downstream components even if filter material body 30 and annular sieve 40 are clogged.

Figure 21:
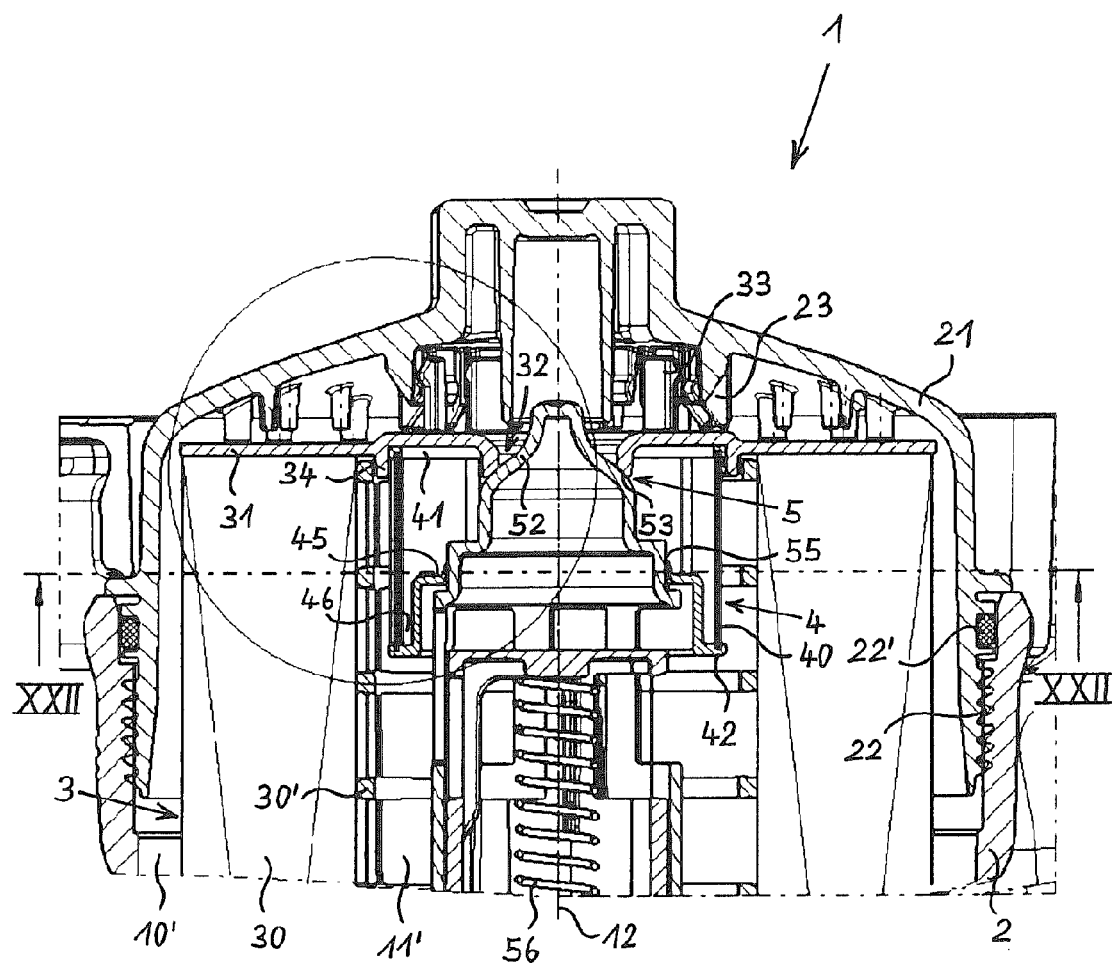
FIG. 21 shows the liquid filter with filter bypass valve and sieve element in a third embodiment, in a partial longitudinal section.

FIG. 21 shows a third embodiment of liquid filter 1, again in longitudinal section through its upper part. Housing 2, cover 21, and filter insert 3 with support body 30' again correspond to the examples described above. The example shown in FIG. 21 differs from the previously described examples in that now sieve element 4 is connected to upper end plate 31, and that valve body 52 is therefore axially movable not only relative to its valve seat 53 but also relative to sieve element 4.

In the closed position of filter bypass valve 5 shown in FIG. 21, a sealing ring region 45 provided radially inwardly on sieve element 4 works together in sealing fashion with an outer circumferential region 55 of valve body 52.

With regard to the further reference characters used in FIG. 21, reference is made to the preceding description.

Figure 22:
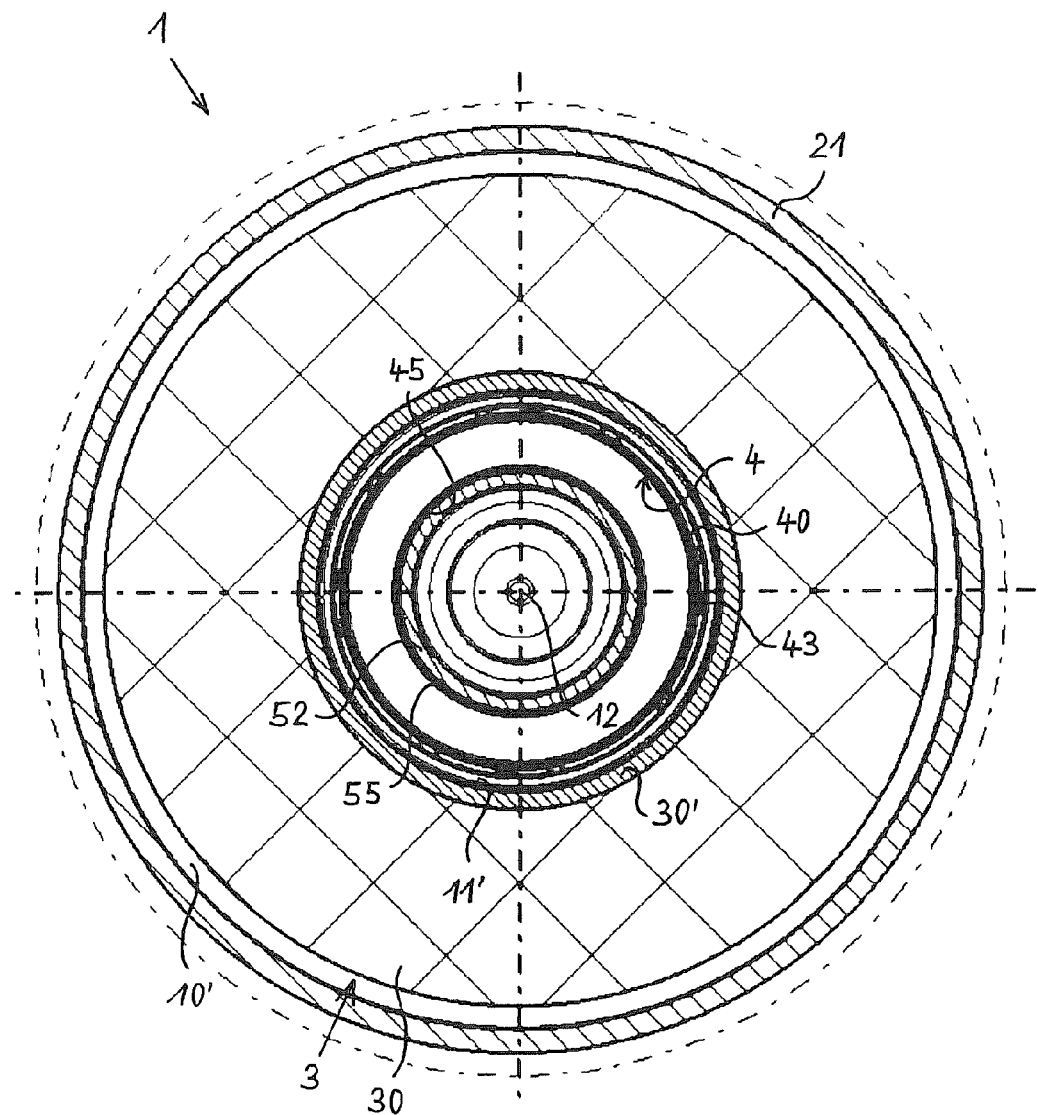
FIG. 22 shows the liquid filter of FIG. 21 in cross-section according to sectional line XXII-XXII in FIG. 21.

FIG. 22 shows liquid filter 1 of FIG. 21 in a longitudinal section along sectional line XXII-XXII in FIG. 21. Cover 21 is again situated radially externally, followed radially inwardly by clean side 11'. There then follows, radially inwardly, filter insert 3 having filter material body 30 and having support body 30', supporting the body radially inwardly. Radially inwardly therefrom there then follows annular sieve 40 of sieve element 4, and still further radially inwardly, finally, there follows valve body 52, through whose center there runs longitudinal mid-axis 12 of liquid filter 1, perpendicular to the plane of the drawing.

Figure 23:
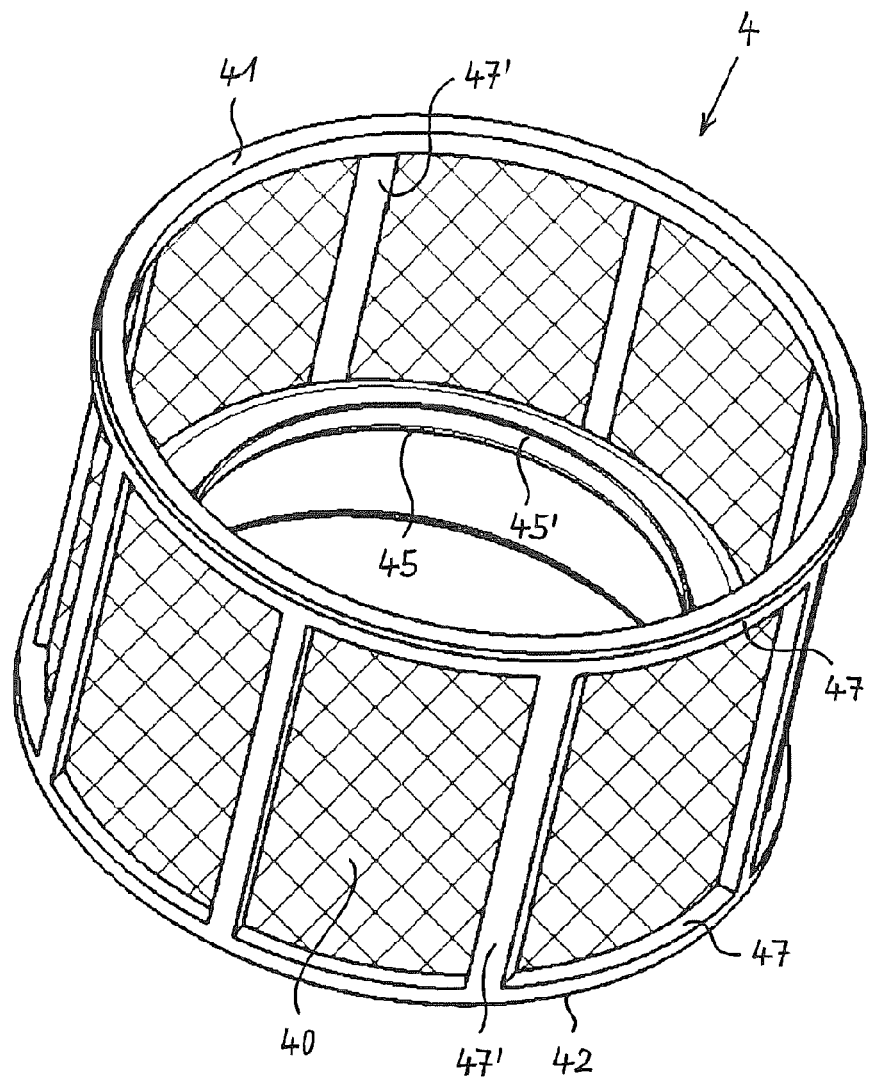
FIG. 23 shows the sieve element of the liquid filter of FIG. 21 as an individual part, in a perspective view.

FIG. 23 shows sieve element 4 of the liquid filter of FIG. 21 as an individual part, in a perspective view. Here as well, sieve element 4 is made up of hollow cylindrical annular sieve 40, whose upper end face region 41 and lower end face region 42 are each mechanically stabilized by a respective reinforcing ring 47. A plurality of reinforcing struts 47' run parallel to one another in the axial direction between the two reinforcing rings 47, distributed around the circumference.

Here, in the interior of sieve element 4 is situated its sealing ring region 45, which runs out radially inwardly and at the top into a sealing lip 45'. In the assembled state of liquid filter 1, this sealing lip 45' works together with associated outer circumferential region 55 of valve body 52.

Figure 24:
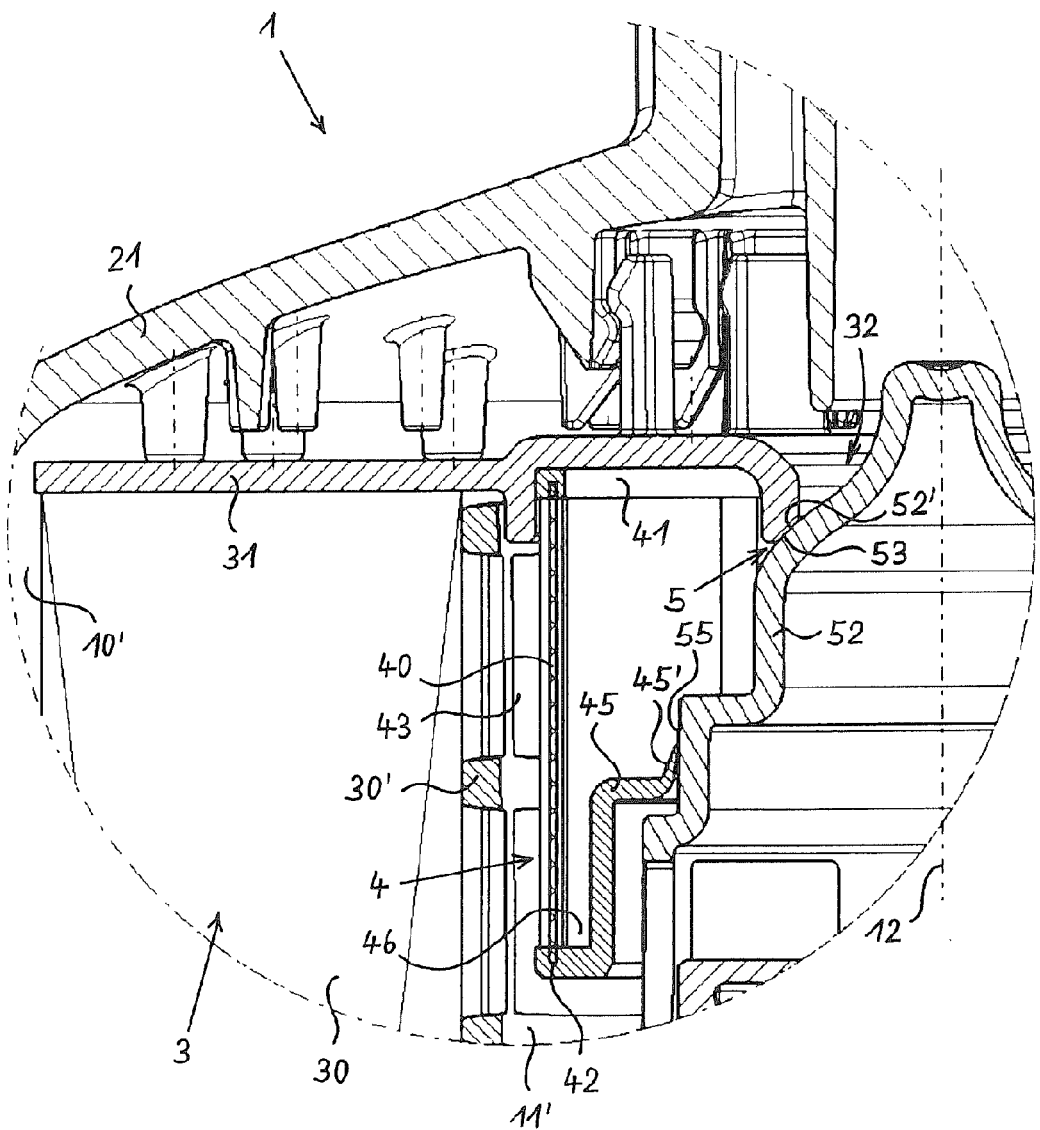
FIG. 24 shows the segment circled in FIG. 21 of the liquid filter with the filter bypass valve in the closed position, in an enlarged sectional view.

FIG. 24 shows, in an enlarged view, the region of liquid filter 1 circled in FIG. 21, filter bypass valve 5 being closed in FIG. 24 as well. Here, sieve element 4 is connected, at its upper end face region 41, to sealing collar 34 of upper end plate 31 in sealing fashion and in axially immovable fashion. A flow of liquid through liquid filter 1 from its raw side 10' to its clean side 11' is therefore here again possible only through filter material body 30.

Figure 25:
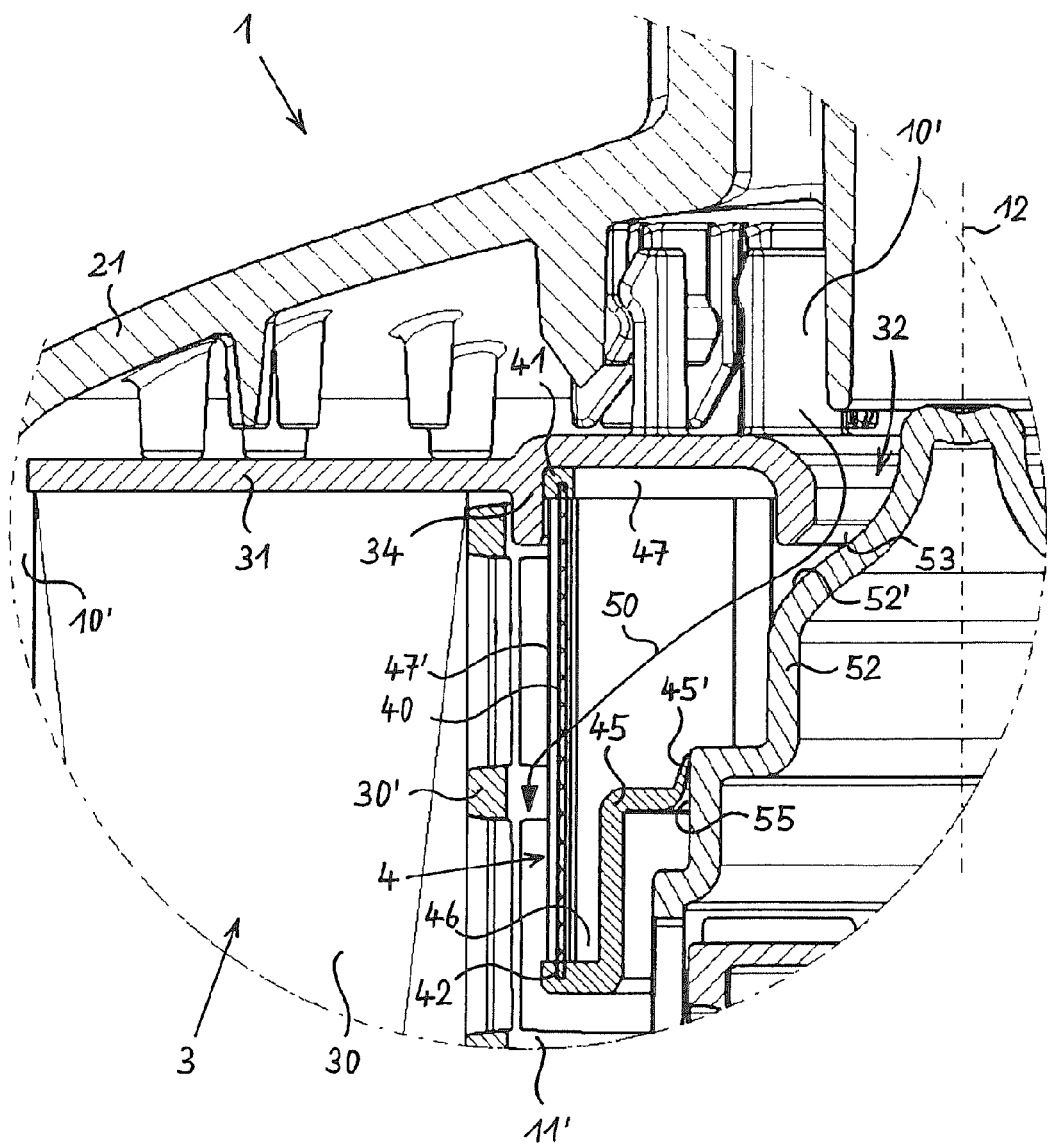
FIG. 25 shows the segment according to FIG. 24, now with the filter bypass valve in a first open position.

In the first open position of filter bypass valve 5, shown in FIG. 25, valve body 52 is displaced by a certain distance in the opening direction relative to its valve seat 53. At the same time, valve body 52 is also displaced relative to sieve element 4, which here is not axially movable. Sieve element 4 is sealed, with its sealing ring region 45 and sealing lip 45' provided there, against associated outer circumferential region 55 of valve body 52. During the displacement from the closed position into the first open position shown in FIG. 25, this seal remains in place. In this way, a bypass flow path 50 is released that runs through now-open filter bypass valve 5 and through annular sieve 40 of sieve element 4.

Figure 26:
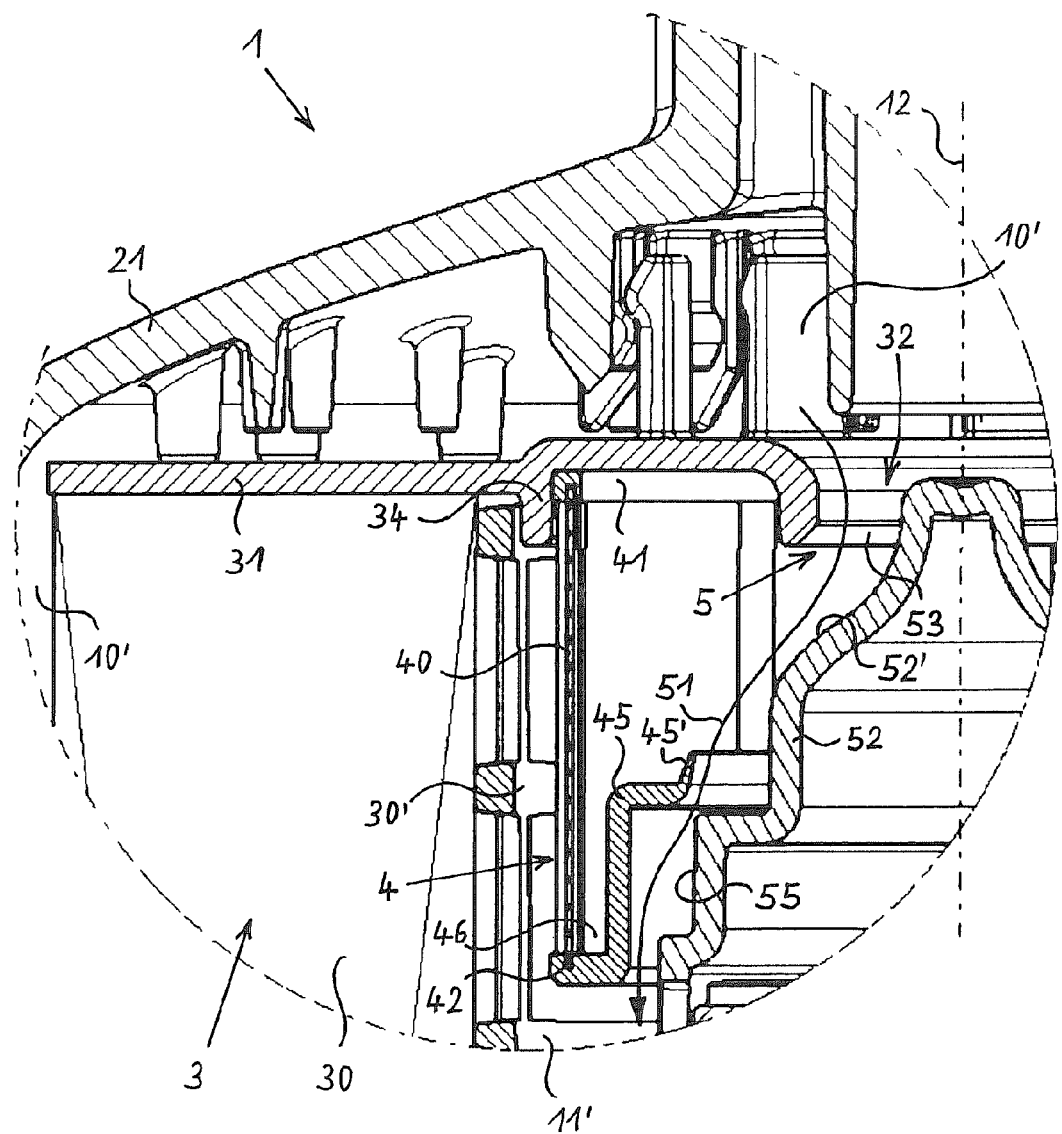
FIG. 26 shows the segment according to FIG. 24, now with the filter bypass valve in a second open position.

FIG. 26 shows the state that filter bypass valve 5 assumes when the liquid pressure difference increases still further. Here, valve body 52 is displaced still further in the opening direction, whereby valve body 52 is simultaneously also displaced still further relative to sieve element 4. The displacement is now great enough that outer circumferential region 55 of valve body 52 moves out of engagement with sealing ring region 45 and with sealing lip 45' of sieve element 4; at the height of sealing lip 45', there is now situated a region of valve body 52 having a smaller diameter. As a result, now a bypass flow path cross-section 51 is released that connects raw side 10' of filter 1 to clean side 11', bypassing both filter material body 30 and annular sieve 40. In this way, here as well a supply of liquid to downstream components is ensured when filter material body 30 and annular sieve 40 are clogged by dirt particles.

Figure 27:
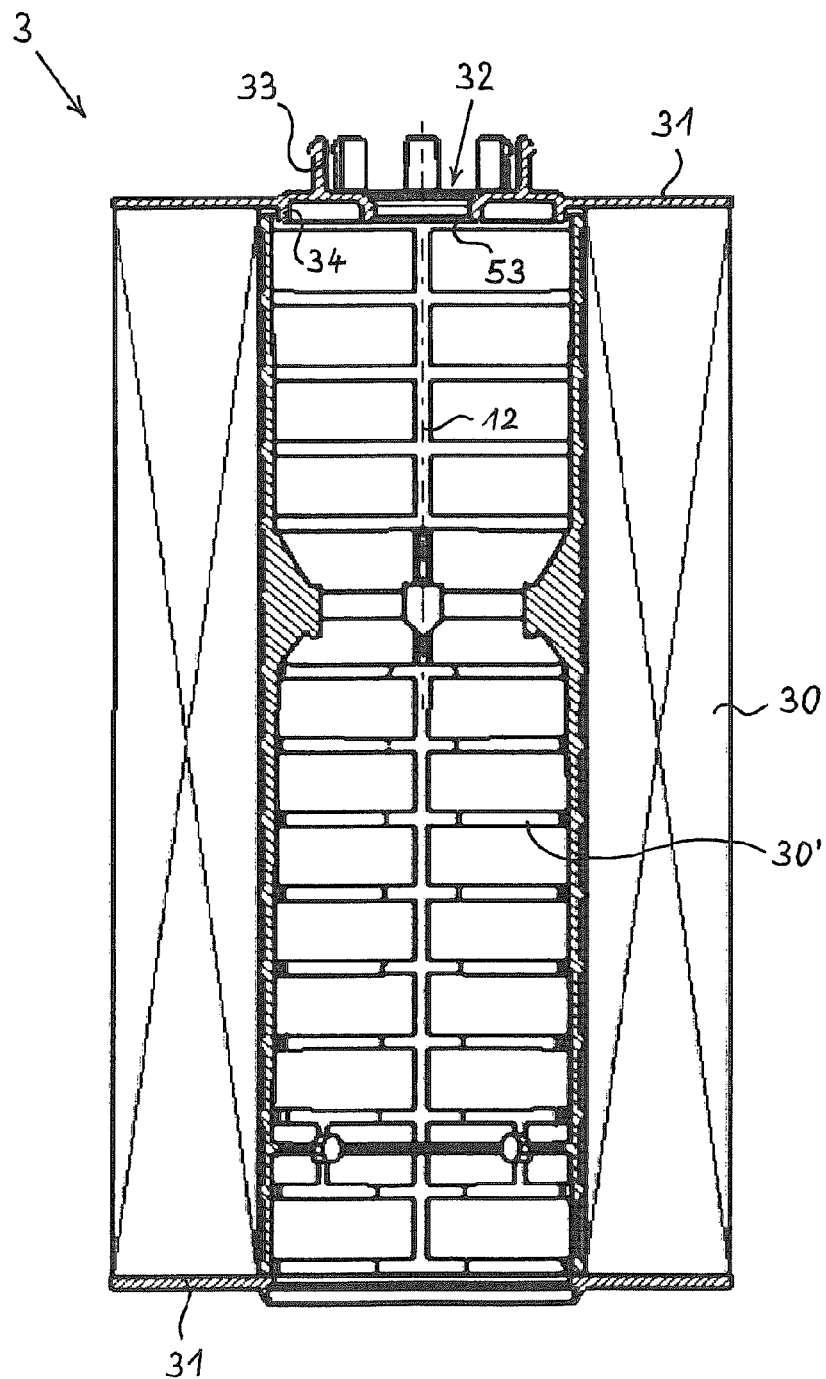
FIG. 27 shows a filter insert as an individual part in a first embodiment in longitudinal section.

FIG. 27 shows a filter insert 3 as an individual part in a first embodiment, in longitudinal section. Filter insert 3 is made up of a filter material body 30 in the form of a hollow cylinder that is covered at its ends by two end plates 31. A grid-type supporting body 30' is situated inside filter material body 30. Upper end plate 31 in FIG. 27 has a central perforation 32 that is situated concentric to longitudinal mid-axis 12 of filter insert 3. A circumferential lower edge of perforation 32 forms a valve seat 53 for interaction with the above-described valve body of a bypass valve. On the upper side of upper end plate 31, a plurality of locking tongues 33 are integrally formed in a crown configuration, and interact with a cover of an associated filter housing.

From the underside of upper end plate 31, a circumferential hollow cylindrical sealing collar 34, made in one piece therewith, extends downward, and interacts with an upper end face region of a sieve element that is connected to the valve body (not shown here), as described above.

Figure 28:
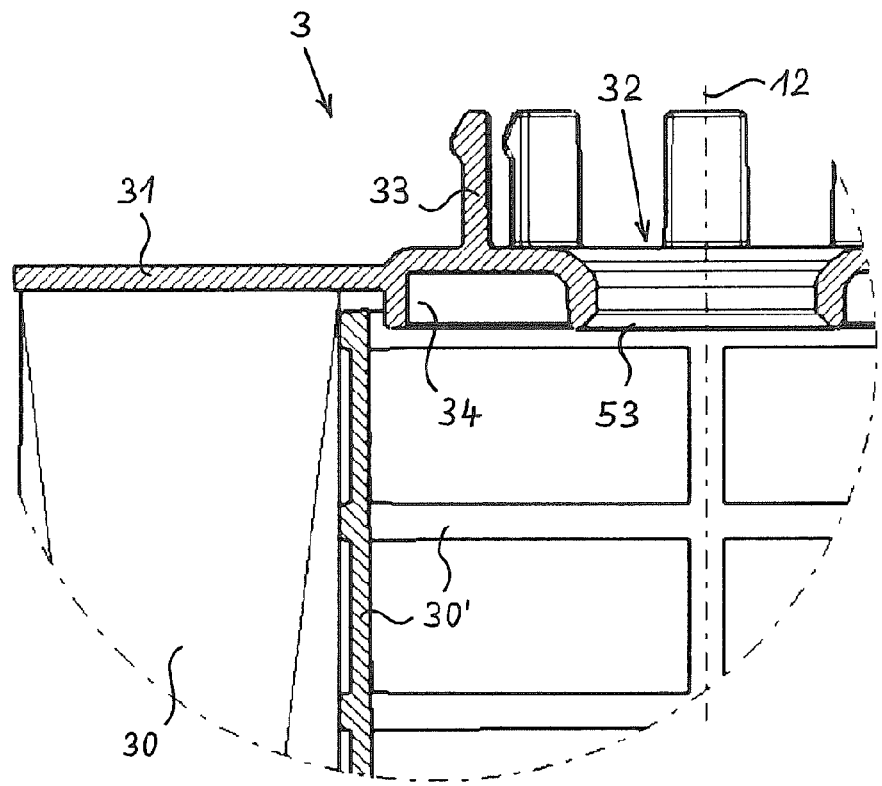
FIG. 28 shows an enlarged segment of the filter insert according to FIG. 27.

FIG. 28 shows an enlarged segment of filter insert 3 according to FIG. 27, the segment showing the left upper end region of filter insert 3. At left in FIG. 28, a part of filter material body 30 can be seen that is covered at its upper end by upper end plate 31. Support body 30' is situated in the interior of filter material body 30. In the center of upper end plate 31, concentric to longitudinal mid-axis 12 there is situated central perforation 32, with valve seat 53 provided on the lower side thereof. Sealing collar 34 is situated radially outwardly from valve seat 53, running concentric thereto. From the upper side of end plate 31, locking tongues 33 extend upward, surrounding central perforation 32 at a radial distance therefrom.

Figure 29:
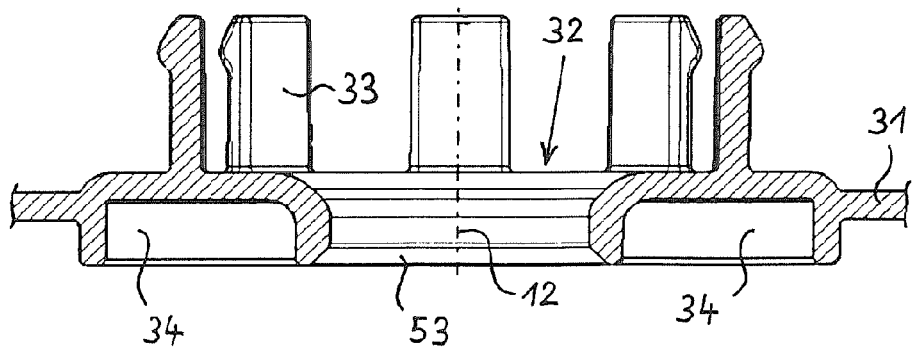
FIG. 29 shows an end plate of the filter insert according to FIG. 27.

FIG. 29 shows upper end plate 31 of filter insert 3 according to FIG. 27. Here, the situation concentric to longitudinal mid-axis 12 of perforation 32, valve seat 53, sealing collar 34, and the crown of locking tongues 33 is again clearly visible.

Figure 30:
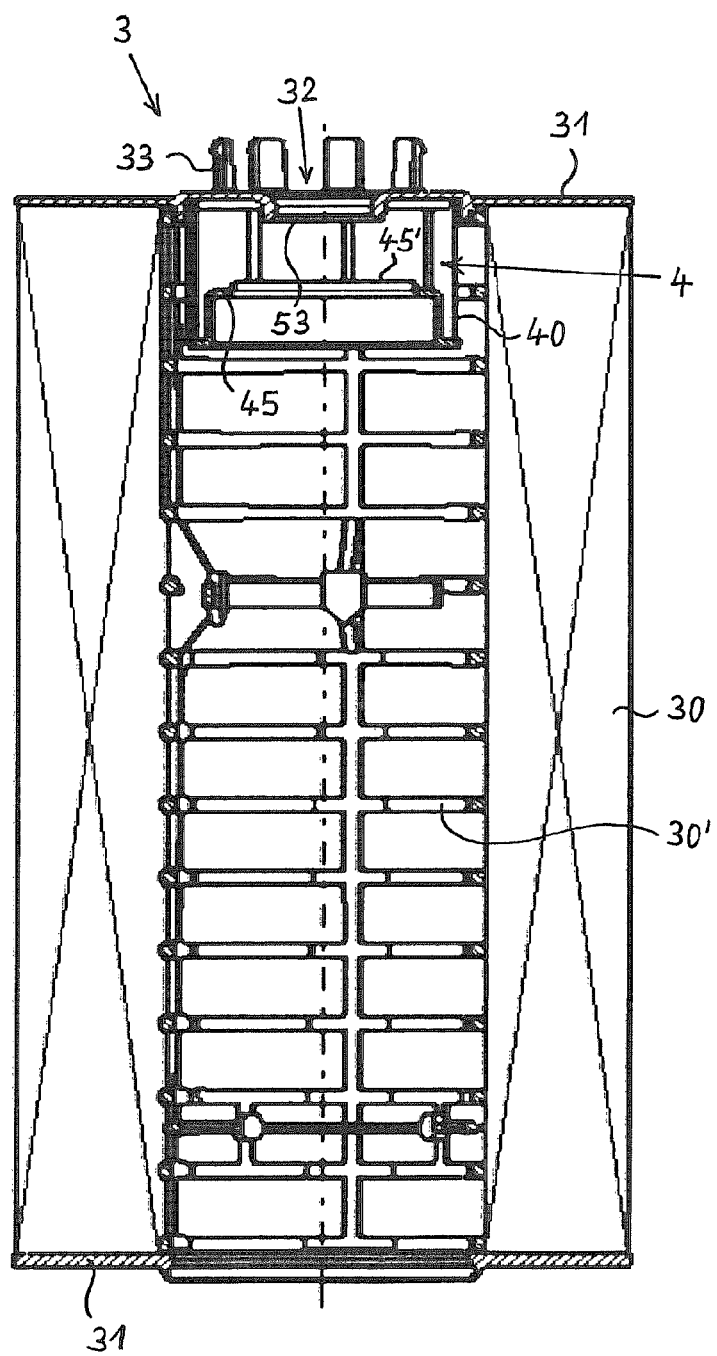
FIG. 30 shows the filter insert as an individual part in a second embodiment, in the same representation as in FIG. 27.

FIG. 30 shows filter insert 3, again as an individual part, in a second embodiment in longitudinal section. Here as well, filter insert 3 is made up of filter material body 30, the two end plates 31 enclosing this body at its ends, and support body 30' situated in the interior. Here as well, upper end plate 31 is made concentric to longitudinal mid-axis 12 with central perforation 32 and with valve seat 53, as well as with the crown of upward-protruding locking tongues 33.

Here, a difference from the example of FIGS. 27 through 29 is that a sieve element 4 is connected to upper end plate 31 at the underside. Sieve element 4 includes a hollow cylindrical annular sieve 40 that is connected with its upper end face region to the underside of upper end plate 31, for example by locking or welding or gluing. Thus, here sieve element 4 is a part of filter insert 3.

In a lower, radially inner region, sieve element 4 has a sealing ring region 45 that runs out radially inwardly into a flexible sealing lip 45'. Sealing lip 45' is provided for interaction with a mating outer circumferential region of an associated valve body, as described above.

Figure 31:
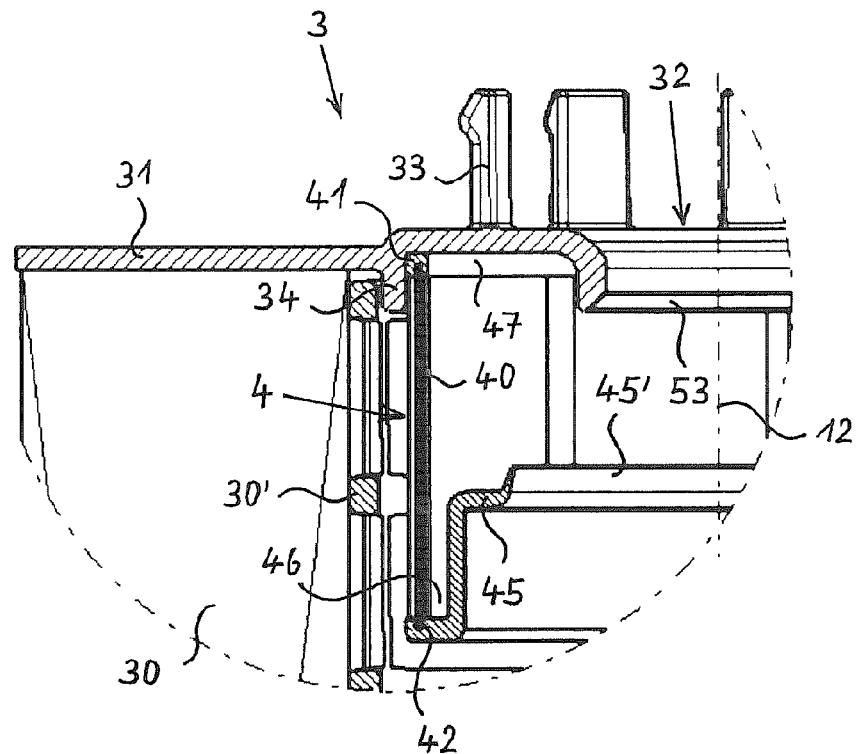
FIG. 31 shows an enlarged segment of the filter insert according to FIG. 30.

FIG. 31 shows an enlarged segment of filter insert 3 according to FIG. 30; here again the left upper end region thereof is shown. At left in FIG. 31, a part of filter material body 30 is again visible, covered at its upper end face by upper end plate 31. Support body 30' is situated radially inwardly from filter material body 30. Here as well, upper end plate 31 has, concentric to longitudinal mid-axis 12, central perforation 32, whose downward-pointing edge forms valve seat 53. Sealing collar 34 is situated radially outwardly from perforation 32, on the underside of end plate 31, said collar being integrally formed in one piece with end plate 31, in an annular circumferential configuration.

FIG. 31 also shows a part of sieve element 4 with hollow cylindrical annular sieve 40. At its upper end face region 41, annular sieve 40 is mechanically reinforced by a reinforcing ring 47, and is at the same time connected tightly to sealing collar 34. Thus, here sieve element 4 forms a part of filter insert 3.

From lower end face region 42 of annular sieve 40, a sealing ring region 45 goes radially inward and then axially upward and then again radially inward, and runs out radially inwardly into flexible sealing lip 45'. When filter insert 3 has been installed in a filter housing, sealing lip 45' works together with a valve body that is displaceable in the direction of longitudinal mid-axis 12, as explained above.

Figure 32:
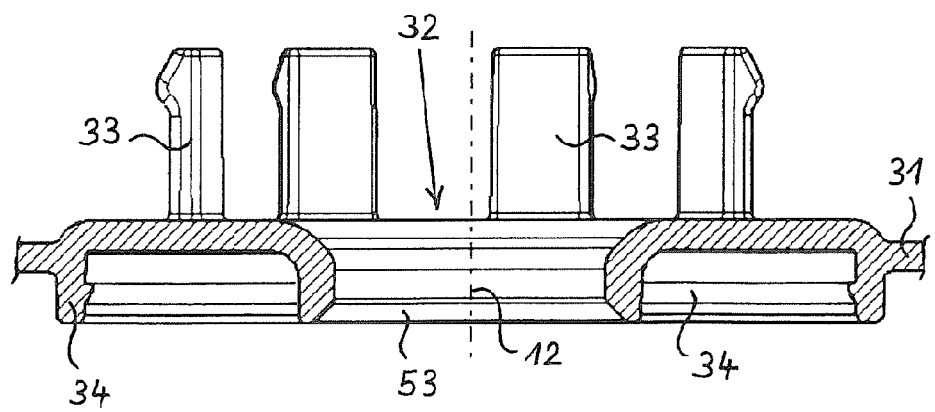
FIG. 32 shows an end plate of the filter insert according to FIG. 30.

FIG. 32 shows end plate 31 of filter insert 3 according to FIG. 30 in a sectional view. Central perforation 32, with downward-pointing valve seat 53, is integrally formed concentric to longitudinal mid-axis 12. Here as well, locking tongues 33 are integrally formed on end plate 31 at the upper side.

Circumferential sealing collar 34 is situated radially externally to valve seat 53, on the underside of end plate 31, and also runs concentric to longitudinal mid-axis 12, said collar being used for connection with sieve element 4 (not shown here). In order to enable a locking connection between end plate 31 and sieve element 4, in the example of FIG. 32 sealing collar 34 is realized with a corresponding contour on its inner circumference. In this way, sieve element 4 can here easily be attached by locking onto end plate 31 with its upper reinforcing ring 47.

Figure 33:
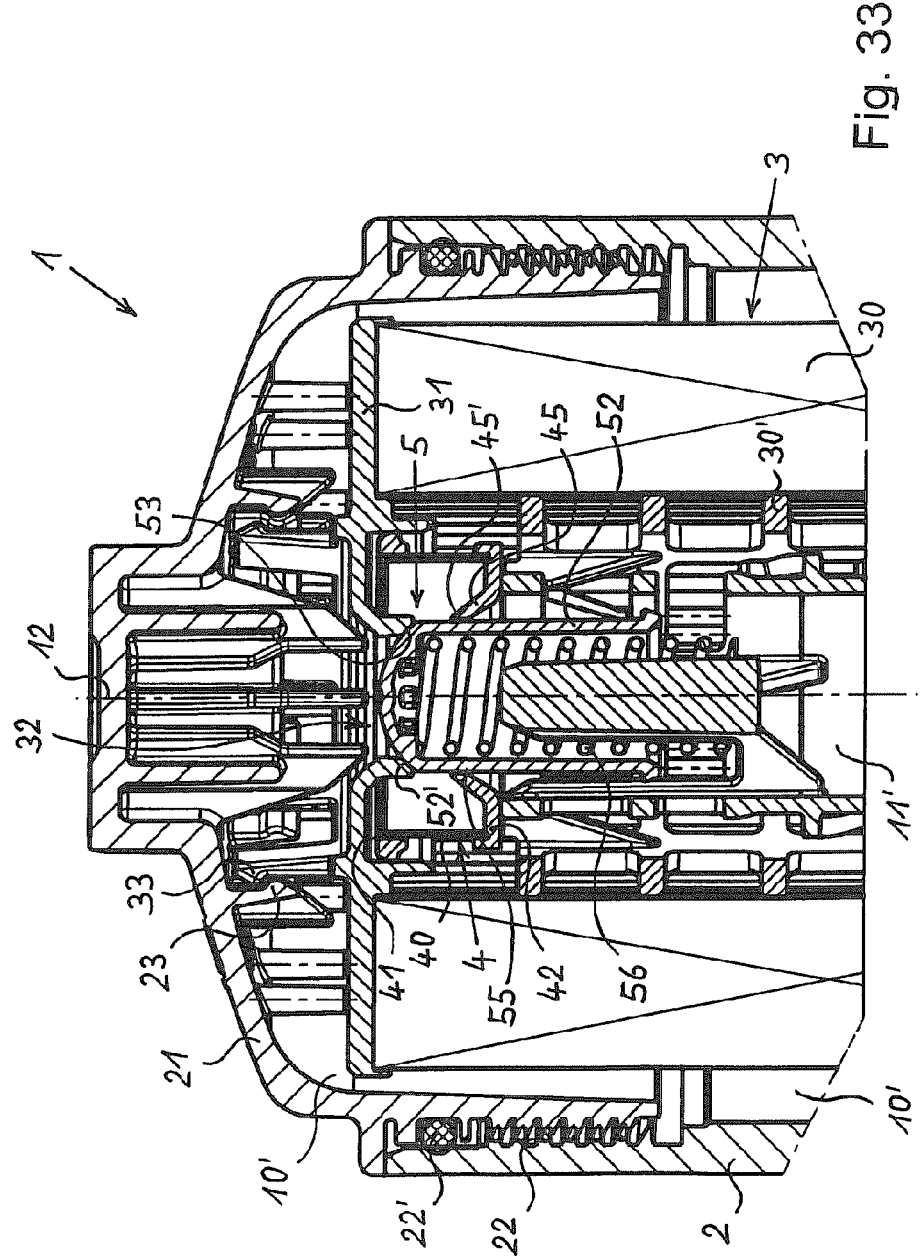
FIG. 33 shows the liquid filter with filter bypass valve and sieve element in a fourth embodiment, with the filter bypass valve in the closed position, in a partial longitudinal section.

FIG. 33 shows liquid filter 1 with filter bypass valve 5 and sieve element 4 in a fourth embodiment, with filter bypass valve 5 in the closed position, in a partial longitudinal section through its upper part. Housing 2 and cover 21 screwed thereon are situated externally, and behind them raw side 10' is situated on the inside. Following these radially inwardly is filter insert 3, having filter material body 30 and having support body 30' supporting this body radially inwardly, i.e. on clean side 11'. Radially inward therefrom is then situated annular sieve 40 of sieve element 4, and, finally, still further radially inward there follows valve body 52, through whose center there runs longitudinal mid-axis 12 of liquid filter 1. Housing 2, cover 21, and filter insert 3 with supporting body 30' again correspond to the examples described above.

Differing from the example of FIG. 21, here sieve element 4 is a part of support body 30'. Valve body 52 is axially movable relative to its valve seat 53 and also relative to sieve element 4.

In the closed position, shown in FIG. 33, of filter bypass valve 5, on the one hand sealing region 52' of valve body 52 works together in sealing fashion with valve seat 53 fashioned on upper end plate 31 of filter insert 3, and at the same time a sealing ring region 45 provided radially inwardly on sieve element 4, and having a sealing lip 45', works together in sealing fashion with an outer circumferential region 55 of valve body 52. The fluid medium to be filtered, such as lubricant oil, now flows solely through filter material body 30 from raw side 10' to clean side 11'.

Figure 34:
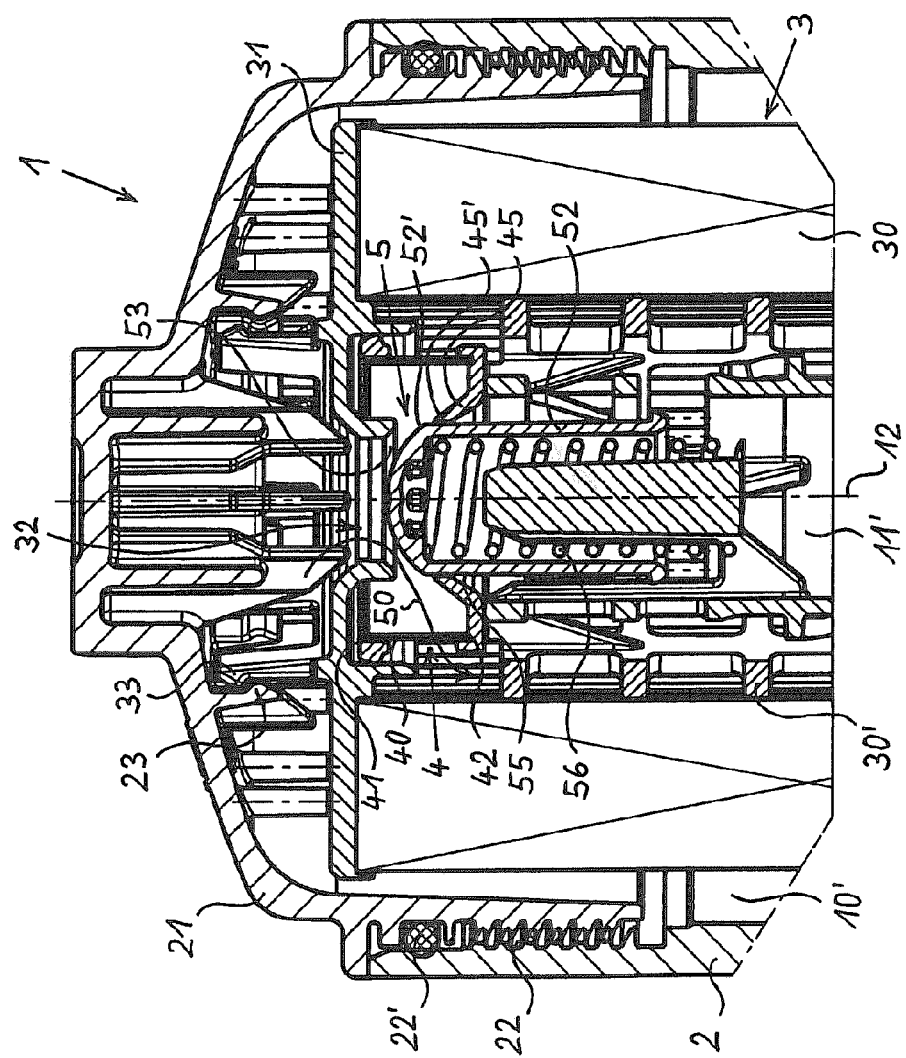
FIG. 34 shows the liquid filter of FIG. 33 with the filter bypass valve in a first open position, in partial longitudinal section.

In the first open position of filter bypass valve 5, which is shown in FIG. 34 and which occurs when the pressure difference between raw side 10' and clean side 11' reaches a first boundary value, valve body 52 is displaced by a certain distance in the opening direction relative to valve seat 53 and is lifted off therefrom. At the same time, valve body 52 is also displaced relative to sieve element 4, which here is not axially movable. Here, however, sieve element 4, with its sealing ring region 45 and sealing lip 45' provided there, remains sealed as before against the associated outer circumferential region 55 of valve body 52. During the displacement of valve body 52 from the closed position shown in FIG. 33 into the first open position shown in FIG. 34, this seal remains in effect. In this way, a bypass flow path 50 is now released that runs through now-open filter bypass valve 5 and through annular sieve 40 of sieve element 4.

Figure 35:
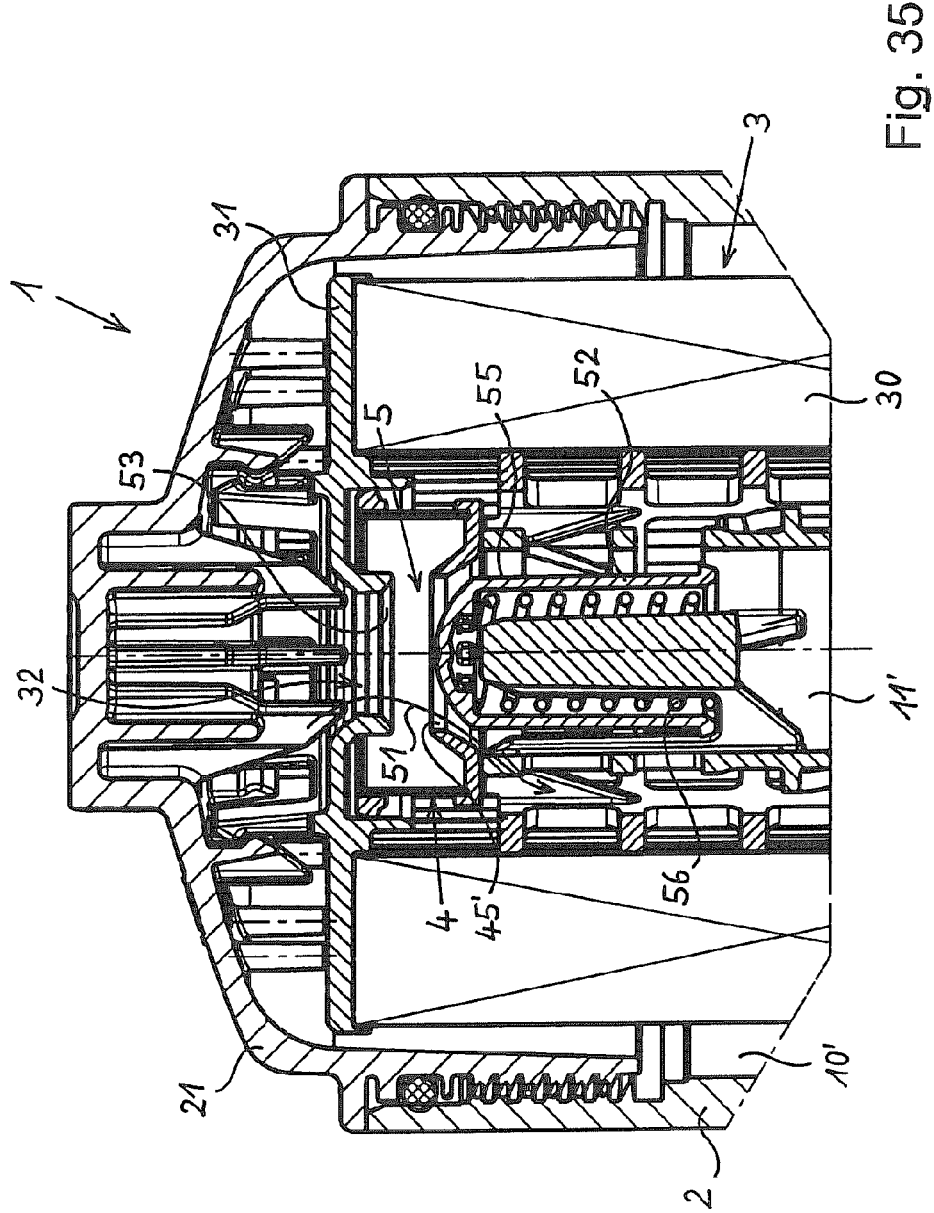
FIG. 35 shows the liquid filter of FIGS. 33 and 34 with the filter bypass valve in a second open position, in partial longitudinal section.

FIG. 35 shows the state assumed by filter bypass valve 5 when the pressure difference between raw side 10' and clean side 11' increases still further. Here, valve body 52 is displaced still further in the opening direction, whereby at the same time valve body 52 is also displaced still further relative to sieve element 4. Here the displacement of valve body 52 is now so great that its outer circumferential region 55 moves out of engagement with sealing ring region 45 and with sealing lip 45' of sieve element 4. As a result, a bypass flow path cross-section 51 is now released that connects raw side 10' of filter 1 to clean side 11', bypassing both filter material body 30 and also annular sieve 40. In this way, here as well a supply of fluid to downstream components is ensured even when both filter material body 30 and annular sieve 40 are clogged by dirt particles.

With regard to the reference characters used in FIGS. 33 through 35, reference is made to the preceding description.

Figure 36:
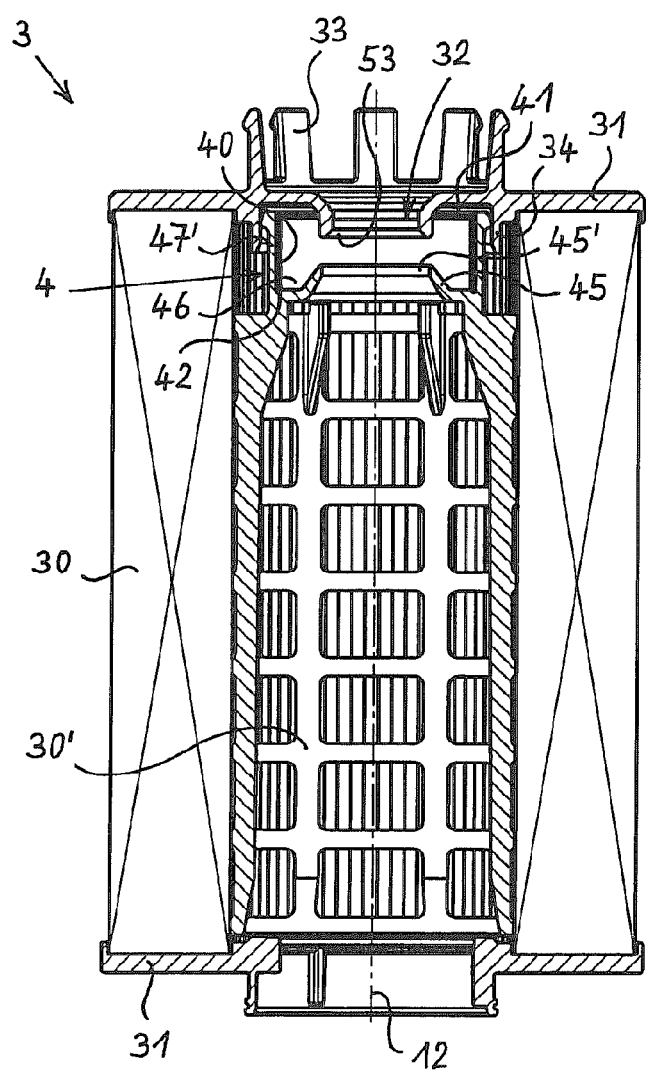
FIG. 36 shows a filter insert of the liquid filter of FIGS. 33 through 35 in a longitudinal section.

FIG. 36 shows filter insert 3 of liquid filter 1 of FIGS. 33 through 35, as an individual part in a longitudinal section. Here as well, filter insert 3 is made up of filter material body 30, the two end plates 31 enclosing said body at its ends, and support body 30' situated between them in the interior of filter material body 30. Here as well, upper end plate 31 is made concentric to longitudinal mid-axis 12 with central perforation 32 and with valve seat 53, as well as with the crown of locking tongues 33 protruding upward.

It is characteristic of this example that sieve element 4 is part of support body 30' and is connected to it or is made in one piece therewith. Sieve element 4 comprises a hollow cylindrical annular sieve 40 that, with its upper end face region 41, is inserted into a circumferential sealing collar 34 integrally formed on the lower side of upper end plate 31, so as to form a seal and such that it is axially not movable during operation.

In its lower, radially inner part, sieve element 4 has an annular ring region 45 that runs out radially inwardly into a flexible sealing lip 45'. Sealing lip 45' is used for sealing interaction with an outer circumferential region 55 of associated valve body 52 (not shown in FIG. 36), as described above on the basis of FIGS. 33 through 35. Radially outward from sealing ring region 45, which inclines upward and obliquely inward, there is formed an annular dirt particle collecting region 46 in which dirt particles separated out at annular sieve 40 can be deposited without disturbing the functioning of bypass valve 5.

Figure 37:
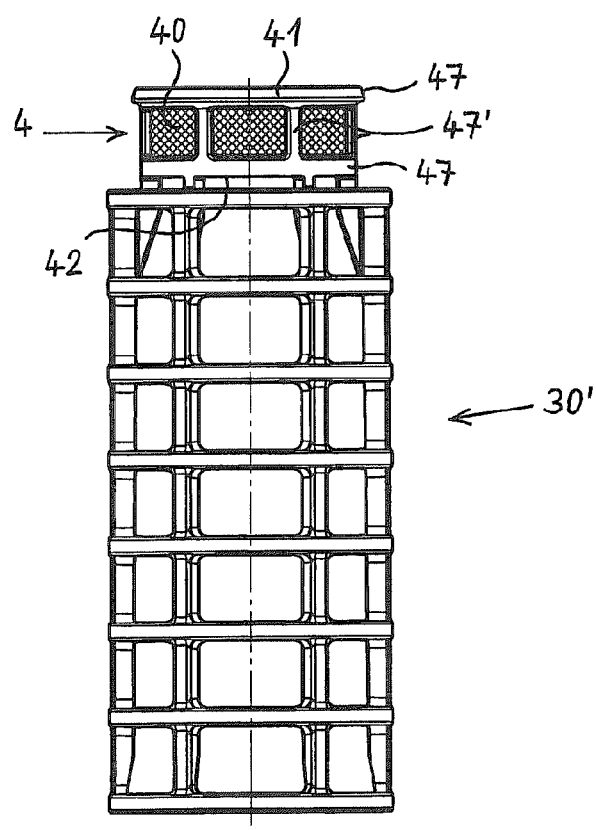
FIG. 37 shows a support body with sieve element as a part of the filter insert of FIG. 36, in a side view.

FIG. 37 shows support body 30' with sieve element 4 as a part of filter insert 3 of FIG. 36, in a side view. Support body 30' has a hollow cylindrical basic shape, and is made up, in one piece, of grid-type struts that run axially and in the circumferential direction. An upper end region of support body 30' is formed by sieve element 4, which is made up essentially of annular sieve 40, e.g. of a sieve mesh. An upper end face region 41 and a lower end face region 42 of sieve element 4 are mechanically reinforced by reinforcing rings 47. Between the two reinforcing rings 47 there run a plurality of axial reinforcing struts 47'. In the interior of sieve element 4 there is situated (not visible here) its sealing ring region 45 with sealing lip 45'. Support body 30', including sieve element 4, can advantageously be produced at low cost as an injection-molded part made of plastic.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 liquid filter
10 inflow side
10' raw side
11 outflow side
11' clean side
12 longitudinal mid-axis
13 contour
14 sealing collar on 13
2 filter housing
21 cover
22 screw threading
22' seal in 22
23 locking ring on 21
3 filter insert
30 filter material body
30' support body in 30
31 end plates
32 central perforation in 31
33 locking tongues on 31
34 sealing collar on 31
4 sieve element
40 annular sieve
41 first (upper) end face region of 4
42 second (lower) end face region of 4
43 guide and centering ribs
44 clamp ring
45 sealing ring region
45' sealing lip
46 dirt particle collection area
47 reinforcing rings
47' reinforcing struts
5 bypass valve
50 bypass flow path
50' pipe sockets
51 sieve-free bypass flow path cross-section
52 valve body
52' sealing region having 53 on 52
53 valve seat
54 sieve bearer
55 outer circumferential region
56 spring
57 valve cage

The invention claimed is:

1. A bypass valve of a device through which a fluid medium flows, the device having a varying flow resistance, comprising:
   a valve seat and
   a valve body that works together with the valve seat and to which there is applied a preloading force in the closing direction,
   the valve body being movable in the opening direction by a fluid medium pressure difference, exceeding a specifiable boundary value, between an inflow side and an outflow side of the bypass valve,
   a bypass flow path running through the valve seat that connects the inflow side and the outflow side of the bypass valve while bypassing the device,
   a sieve element situated in the bypass flow path,
   wherein the valve body has two different opening position regions that are a function of the medium pressure difference, such that in a first opening position region of the valve body, given a lower fluid medium pressure difference, an entire cross-section of the bypass flow path is covered by the sieve element, and in a second opening position region of the valve body, given a greater fluid medium pressure difference, in addition, a sieve-free bypass flow path cross-section is exposed, wherein the sieve element is formed as a part of a contour limiting the bypass flow path, and wherein the valve body, in its first opening position region, is axially movably seated in sealing fashion on the sieve element, and wherein the valve body, in its second opening position region, is situated at a distance from the sieve element.

2. The bypass valve as recited in claim 1, wherein in the second opening position region of the valve body, the sieve element covers only a part of the cross-section of the bypass flow path, and the additional sieve-free bypass flow path cross-section is thus exposed.

3. The bypass valve as recited in claim 1, wherein the sieve element is tightly connected with its one end face region to the contour that has the valve seat and that limits the bypass flow path, concentric to the valve seat, and wherein the sieve element has at its other end face region, radially inwardly, a sealing ring region that runs concentric to the valve seat, and wherein the axially movable valve body has an outer circumferential region that in the first opening position region of the valve body is axially movable seated in sealing fashion on the sealing ring region of the sieve element, and wherein, in the second opening position region of the valve body, is situated axially at a distance from the sealing ring region.

4. The bypass valve as recited in claim 3, wherein the sieve element is one of detachably connected to the contour having the valve seat by one of being pressed, clamped, locked and screwed thereto, fixedly connected to the contour having the valve seat by one of being glued and welded thereto, and being made in one piece with the contour.

5. The bypass valve as recited in claim 1, wherein the sieve element is formed as a hollow cylindrical annular sieve having a dirt particle collecting region that is open only upwardly during operation of the device.

6. The bypass valve as recited in claim 1, wherein the sieve element has at least one upper and one lower reinforcing ring running in the circumferential direction, as well as a plurality of reinforcing struts running between the reinforcing rings in one of the axial direction and oblique to the axial direction.

7. The bypass valve as recited in claim 1, wherein the sieve element has guide and centering ribs that are distributed radially externally around its circumference and that work together with an inner circumference of a contour that limits the bypass flow path.

8. A device having a bypass valve as recited in claim 1, wherein the device is a liquid filter having a housing that has a removable cover, having an inlet, opening into a raw side of the device, for liquid that is to be filtered, and having an outlet, going out from a clean side of the device, for filtered liquid, and having an exchangeable filter insert that separates the raw side and the clean side from one another, the filter insert being made up of a hollow cylindrical filter material body enclosed at its ends by two end plates, and wherein the bypass valve is a filter bypass valve whose valve seat is one of situated on and formed on the filter insert.

9. The device as recited in claim 8, wherein the valve seat is formed on a central perforation in one of the two end plates of the filter insert.

10. The device as recited in claim 9, wherein the valve seat is provided on the end plate of the filter insert that is in an upper position during operation of the liquid filter.

11. The device as recited in claim 8, wherein the valve body is situated in an interior of the hollow cylindrical filter insert and is guided so as to be axially movable therein.

12. The device as recited in claim 8, wherein the sieve element has guide and centering ribs that are distributed radially externally around its circumference and that work together with an inner circumference of a perforated support body situated in the hollow cylindrical filter insert.

13. The device as recited in claim 8, wherein the sieve element is formed as a part of the filter insert, and wherein the valve body, in its first opening position region, is axially movably seated in sealing fashion on the sieve element, and wherein the valve body, in its second opening position region, is situated at a distance from the sieve element.

14. The device as recited in claim 13, wherein the sieve element is tightly connected with its one end face region to the end plate having the valve seat, concentric to the valve seat, and wherein the sieve element has at its other end face region a sealing ring region that is situated radially inwardly and that runs concentric to the valve seat, and wherein the axially movable valve body has an outer circumferential region that in the first opening position region of the valve body works together in sealing fashion with the sealing ring region of the sieve element and that in the second opening position region of the valve body is situated axially at a distance from the sealing ring region.

15. The device as recited in claim 14, wherein the sieve element is one of detachably connected to the end plate having the valve seat by one of being pressed, clamped, locked and screwed, being fixedly connected to the end plate having the valve seat by one of being glued and welded thereto, and being made in one piece with the end plate.

16. A filter insert of a device as recited in claim 14, the filter insert being made up of a hollow cylindrical filter material body enclosed at its ends by two end plates, and having a valve seat of a filter bypass valve, and the valve seat being formed on a central perforation in one of the two end plates of the filter insert, wherein a sieve element, in the form of a hollow cylindrical annular sieve, is tightly connected, with its one end face region, to the end plate having the valve seat, concentric to the valve seat, and wherein the sieve element has at its other end face region, situated radially inwardly, a sealing ring region that runs concentric to the valve seat, in order to work together with an outer circumferential region of an axially movable valve body of the filter bypass valve.

17. The filter insert as recited in claim 16, wherein the sieve element is one of detachably connected to the end plate having the valve seat by one of being pressed, clamped, locked and screwed thereto, being fixedly connected to the end plate having the valve seat by one of being glued and welded thereto, and being made in one piece with the end plate having the valve seat.

18. The filter insert as recited in claim 16, wherein the filter material body of the filter insert has a filter fineness of between 8 and 25 μm, and wherein the sieve element has a sieve fineness of between 100 and 1,000 μm.

19. A filter insert of a device as recited in claim 13, the filter insert being made up of a hollow cylindrical filter material body enclosed at its ends by two end plates, and having a valve seat of a filter bypass valve, and the valve seat being formed on a central perforation in one of the two end plates of the filter insert, wherein the end plate having the valve seat has, concentric to the valve seat, an annular sealing collar pointing axially toward the interior of the filter insert, whose inner circumference is formed to work together in radially sealing fashion with a free end face region, which can be guided in the sealing collar of the end plate in axially displaceable and radially sealing fashion, of a sieve element that is axially movable with a valve body of the filter bypass valve, over a part of the axial movement path of the sieve element.

20. The device as recited in claim 8, wherein the filter material body of the filter insert has a filter fineness of between 8 and 25 µm, and wherein the sieve element has a sieve fineness of between 100 and 1,000 µm.

\* \* \* \* \*